US010799990B2

(12) United States Patent
Sueoka

(10) Patent No.: US 10,799,990 B2
(45) Date of Patent: Oct. 13, 2020

(54) ASSEMBLING APPARATUS, ASSEMBLING HEAD, AND ASSEMBLING METHOD

(71) Applicant: HIRATA CORPORATION, Kumamoto-shi, Kumamoto (JP)

(72) Inventor: Hisayuki Sueoka, Kumamoto (JP)

(73) Assignee: HIRATA CORPORATION, Kumamoto-Shi, Kumamoto-Ken (JP)

( * ) Notice: Subject to any disclaimer, the term of this patent is extended or adjusted under 35 U.S.C. 154(b) by 3 days.

(21) Appl. No.: 15/801,769

(22) Filed: Nov. 2, 2017

(65) Prior Publication Data

US 2018/0117722 A1  May 3, 2018

Related U.S. Application Data

(63) Continuation of application No. PCT/JP2015/080074, filed on Oct. 26, 2015.

(51) Int. Cl.
*B23P 21/00* (2006.01)
*B23P 19/04* (2006.01)
(Continued)

(52) U.S. Cl.
CPC ............. *B23P 19/045* (2013.01); *B23P 21/00* (2013.01); *F01L 3/10* (2013.01); *F01L 3/24* (2013.01); *F01L 2303/01* (2020.05)

(58) Field of Classification Search
USPC ............... 29/213.1; 137/607, 867, 554, 551; 251/251; 123/41.41, 41.77, 90.1,
(Continued)

(56) References Cited

U.S. PATENT DOCUMENTS 5,097,579 A 3/1992 Pringault
5,996,201 A 12/1999 Ringle
(Continued)

FOREIGN PATENT DOCUMENTS

CN 104245225 A 12/2014
JP 59-219133 12/1984
(Continued)

OTHER PUBLICATIONS

International Search Report (PCT/ISA/210) dated Jan. 26, 2016, by the Japanese Patent Office as the International Searching Authority for International Application No. PCT/JP2015/080074.
(Continued)

*Primary Examiner* — Lawrence Averick
(74) *Attorney, Agent, or Firm* — Buchanan Ingersoll & Rooney PC

(57) ABSTRACT

An assembling apparatus assembles a retainer by engaging a pair of cotter pieces with a valve stem. The apparatus includes an assembling head configured to hold, in a separated state, the pair of cotter pieces in the separated state prepared by a preparation unit and engage the pair of cotter pieces with the upper end of the valve stem. The head includes a storage member including a storage chamber, and a holding unit capable of pressing the pair of cotter pieces stored in the storage chamber against the upper end of the valve stem. The storage member includes first and second abutting portions. The second abutting portion positions the valve stem in the axial direction, and the first abutting portion positions the pair of cotter pieces in the axial direction.

10 Claims, 25 Drawing Sheets

(51) Int. Cl.
*F01L 3/10* (2006.01)
*F01L 3/24* (2006.01)

(58) Field of Classification Search
USPC .......... 123/90.48–90.59, 188.2, 188.3, 188.4
See application file for complete search history.

(56) References Cited

U.S. PATENT DOCUMENTS

| | | | |
|---|---|---|---|
| 6,684,492 | B2 | 2/2004 | Tachibana et al. |
| 8,793,851 | B2 | 8/2014 | Shiga et al. |
| 9,387,560 | B2 | 7/2016 | Matsumoto et al. |
| 2003/0200641 | A1* | 10/2003 | Tachibana ............. B23P 19/045 29/247 |
| 2011/0023277 | A1* | 2/2011 | Takagi .................. B23P 19/045 29/225 |
| 2014/0290060 | A1 | 10/2014 | Kikukawa et al. |

FOREIGN PATENT DOCUMENTS

| | | |
|---|---|---|
| JP | 63-267133 A | 11/1988 |
| JP | 04-287810 A | 10/1992 |
| JP | 05-301133 A | 11/1993 |
| JP | 10-061420 A | 3/1998 |
| JP | 11-138366 | 5/1999 |
| JP | 4033703 B2 | 1/2008 |
| JP | 2012-241519 A | 12/2012 |
| JP | 2014-018916 A | 2/2014 |
| JP | 2014-193499 A | 10/2014 |
| JP | 2015-100864 A | 6/2015 |
| WO | WO 2015/075958 A1 | 5/2015 |

OTHER PUBLICATIONS

Extended European Search Report dated Dec. 3, 2018, issued by the European Patent Office in European Application No. 15907190.1. (8 pages).

Extended European Search Report dated Sep. 25, 2018, issued by the European Patent Office in corresponding European Application No. 15907189.3. (11 pages).

Office Action dated Oct. 15, 2019, by the U.S Patent and Trademark Office in co-pending U.S. Appl. No. 15/802,222. (12 pages).

Office Action dated May 15, 2020, by the U.S. Patent and Trademark Office in co-pending U.S. Appl. No. 15/802,222. (13 pages).

Notice of Allowance dated Jun. 23, 2020, by the U.S. Patent and Trademark Office in co-pending U.S. Appl. No. 15/802,222. (12 pages).

* cited by examiner

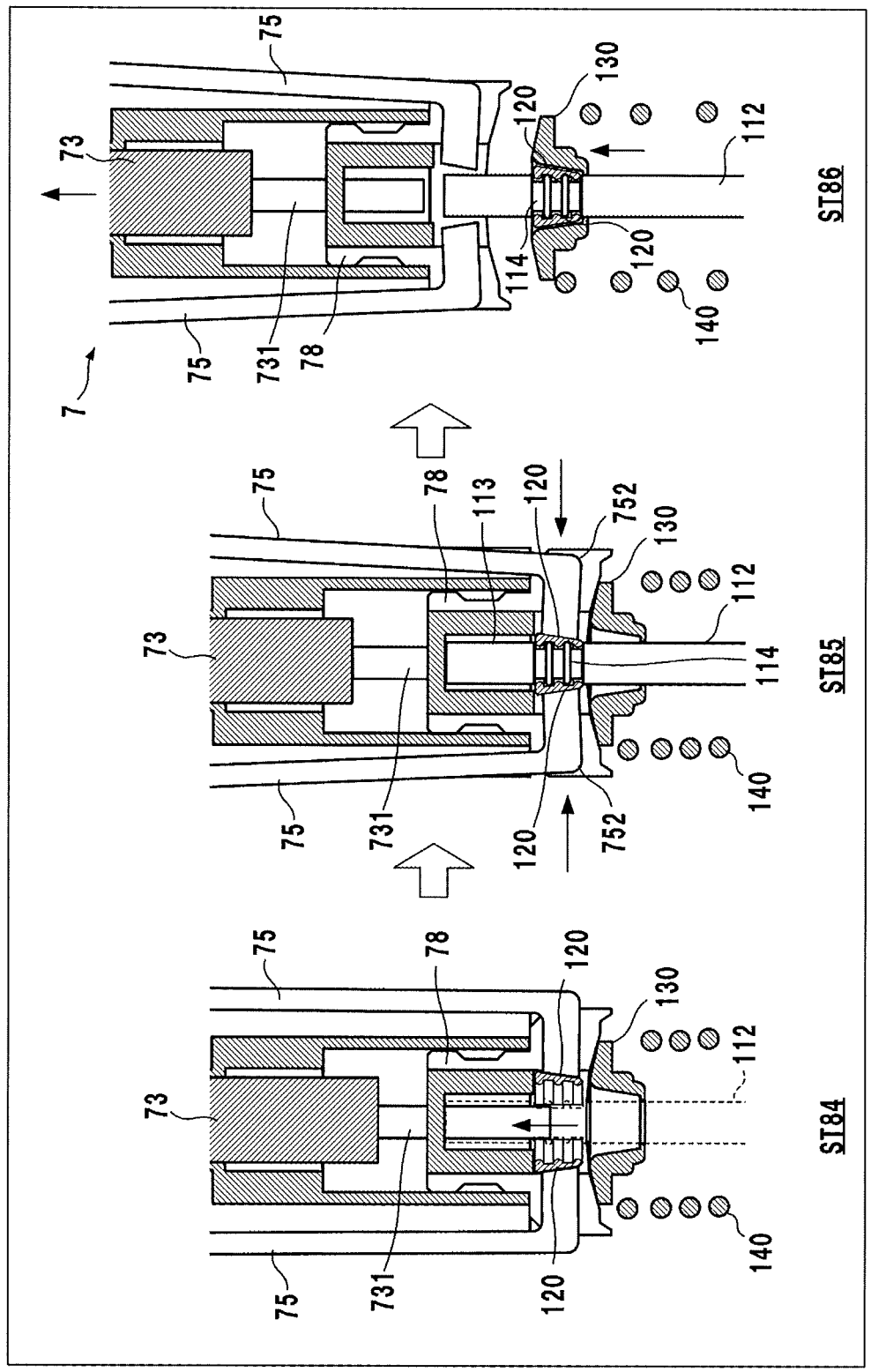

ASSEMBLING APPARATUS, ASSEMBLING HEAD, AND ASSEMBLING METHOD

This application is a continuation of International Patent Application No. PCT/JP2015/080074 filed on Oct. 26, 2015, the entire content of which is incorporated herein by reference.

TECHNICAL FIELD

The present invention relates to a technique of assembling a retainer to the valve stem of an engine.

BACKGROUND ART

A retainer is attached to a valve stem via a pair of cotter pieces. The pair of cotter pieces are parts that engage with the valve stem. Japanese Patent Laid-Open No. 10-61420, Japanese Patent No. 4033703 and Japanese Patent Laid-Open No. 2012-241519 each disclose an apparatus for assembling a retainer with a pair of already assembled cotter pieces to a valve stem. An apparatus of this type lifts a pair of cotter pieces from a retainer to open the pair of cotter pieces, and inserts a valve stem between the pair of cotter pieces. The apparatus then engages the cotter pieces with the engaging grooves of the valve stem, and returns the cotter pieces to the retainer, thereby assembling the retainer to the valve stem. Japanese Patent Laid-Open No. 5-301133 discloses an apparatus that fits a retainer to a valve stem and then fits a pair of cotter pieces prepared in a separated state to the valve stem.

In each of the apparatuses of Japanese Patent Laid-Open No. 10-61420, Japanese Patent No. 4033703 and Japanese Patent Laid-Open No. 2012-241519, adjustment often needs to be performed on an apparatus basis to place the pair of cotter pieces lifted from the retainer in the same posture. Additionally, this adjustment can be done only by much trial and error, and even a skilled operator requires much time for the adjustment. This delays the start of the first operation of the apparatus. Furthermore, in any of the apparatuses of Japanese Patent Laid-Open No. 10-61420, Japanese Patent No. 4033703, Japanese Patent Laid Open No. 2012-241519 and Japanese Patent Laid-Open No. 5-301133, a position shift between the pair of cotter pieces and the valve stem leads to an engagement failure between them.

SUMMARY OF INVENTION

It is an object of the present invention to, when engaging a pair of cotter pieces with a valve stem, perform positioning for the engagement at high accuracy without adjusting an apparatus.

According to an aspect of the present invention, there is provided an assembling apparatus that assembles a retainer by engaging a pair of cotter pieces with an upper end of a valve stem, comprising:

a preparation unit configured to prepare the pair of cotter pieces in a separated state with a gap capable of receiving the upper end of the valve stem;

an assembling head configured to hold, in a separated state, the pair of cotter pieces in the separated state prepared by the preparation unit and engage the pair of cotter pieces with the upper end of the valve stem; and a moving unit configured to move the assembling head between the preparation unit and the valve stem, wherein the assembling head comprises:

a storage member including a storage chamber configured to store the pair of cotter pieces in the separated state from below; and a holding unit capable of holding, in the separated state, the pair of cotter pieces stored in the storage chamber and canceling the separated state to press the pair of cotter pieces against the upper end of the valve stem, the storage member includes:

a first abutting portion provided on an inner wall of the storage chamber, against which upper end faces of the pair of cotter pieces stored in the storage chamber abut; and a second abutting portion provided on an upper wall of the storage chamber, against which an upper end face of the valve stem inserted from below the storage chamber abuts, the second abutting portion positions the valve stem relative to the storage chamber in an axial direction of the valve stem, and the first abutting portion positions the pair of cotter pieces relative to the storage chamber in the axial direction.

According to another aspect of the present invention, there is provided an assembling head that assembles a retainer by engaging a pair of cotter pieces with an upper end of a valve stem, comprising:

a storage member including a storage chamber configured to store the pair of cotter pieces from below in a separated state with a gap capable of receiving the upper end of the valve stem; and a holding unit capable of holding, in the separated state, the pair of cotter pieces stored in the storage chamber and canceling the separated state to press the pair of cotter pieces against the upper end of the valve stem, wherein the storage member includes:

a first abutting portion provided on an inner wall of the storage chamber, against which upper end faces of the pair of cotter pieces stored in the storage chamber abut; and a second abutting portion provided on an upper wall of the storage chamber, against which an upper end face of the valve stem inserted from below the storage chamber abuts, the second abutting portion positions the valve stem relative to the storage chamber in an axial direction of the valve stem, and the first abutting portion positions the pair of cotter pieces relative to the storage chamber in the axial direction.

According to still another aspect of the present invention, there is provided an assembling method of assembling a retainer by engaging a pair of cotter pieces with an upper end of a valve stem, comprising:

a preparation step of preparing the pair of cotter pieces in a separated state with a gap capable of receiving the upper end of the valve stem;

a holding step of holding, in a separated state, the pair of cotter pieces in the separated state prepared in the preparation step by an assembling head; and an assembling step of moving the assembling head to a position of the valve stem on which the retainer and a valve spring are set, engaging the pair of cotter pieces with the valve stem by the assembling head, and assembling the retainer, and further comprising:

a step of, before the pair of cotter pieces is held in the separated state by the assembling head, abutting upper end faces of the pair of cotter pieces against a cotter storage portion of the assembling head to position the pair of cotter pieces relative to the assembling head in a vertical direction; and a step of, before the pair of cotter pieces are engaged with the valve stem, causing the valve stem to enter the assembling head and abutting an upper end face of the valve stem against a valve stem storage portion of the assembling head to position the valve stem relative to the assembling head in the vertical direction, wherein in a state in which the pair of cotter pieces and the valve stem are relatively positioned relative to the assembling head in the vertical direction, the separated state of the pair of cotter pieces is canceled to engage the pair of cotter pieces with the upper end of the valve stem and assemble the retainer to the upper end of the valve stem.

According to still another aspect of the present invention, there is provided an assembling method of assembling a retainer by engaging a pair of cotter pieces with an upper end of a valve stem, comprising:

a preparation step of preparing the pair of cotter pieces in a separated state with a gap capable of receiving the upper end of the valve stem;

a holding step of holding, in a separated state, the pair of cotter pieces in the separated state prepared in the preparation step by an assembling head; and an assembling step of moving the assembling head to a position of the valve stem on which the retainer and a valve spring are set, engaging the pair of cotter pieces with the valve stem by the assembling head, and assembling the retainer, wherein the assembling head comprises:

a storage member including a storage chamber configured to store the pair of cotter pieces in the separated state from below; and a holding unit capable of holding, in the separated state, the pair of cotter pieces stored in the storage chamber and canceling the separated state to press the pair of cotter pieces against the upper end of the valve stem, the holding step includes a step of, when holding the pair of cotter pieces in the separated state, abutting upper end faces of the pair of cotter pieces against a first positioning reference portion of the storage chamber to position the pair of cotter pieces relative to the storage chamber in a vertical direction, the assembling step includes a step of causing the valve stem to enter the storage chamber and abutting an upper end face of the valve stem against a second positioning reference portion of the storage chamber to position the valve stem relative to the storage chamber in the vertical direction, and in a state in which the pair of cotter pieces and the valve stem are relatively positioned in the vertical direction, the separated state of the pair of cotter pieces is canceled by the holding unit to engage the pair of cotter pieces with the upper end of the valve stem and assemble the retainer to the upper end of the valve stem.

BRIEF DESCRIPTION OF DRAWINGS

FIG. 25 is an explanatory view of the cotter assembling head.

DESCRIPTION OF EMBODIMENTS

Outline of Apparatus

Figure 1:
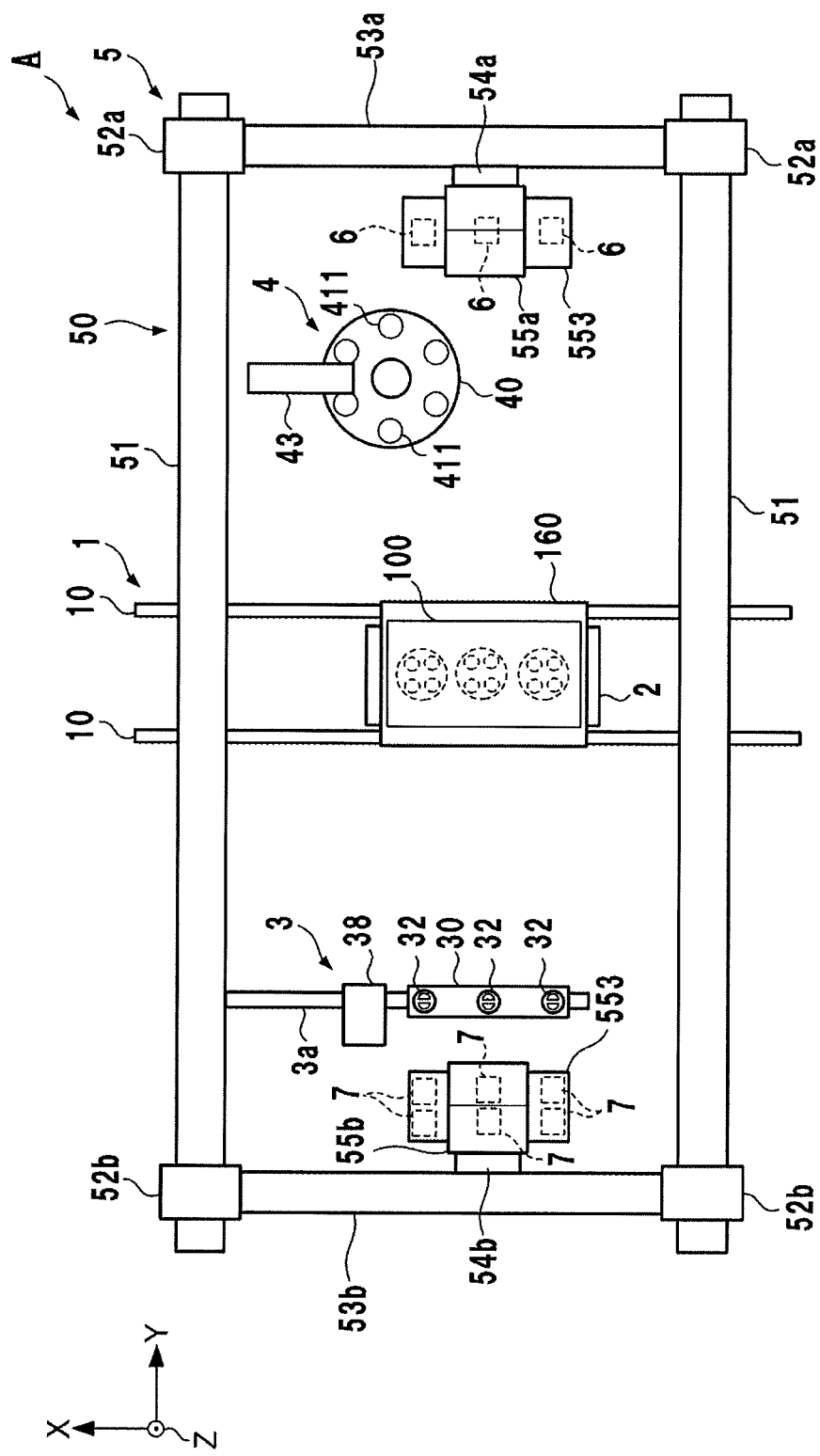
FIG. 1 is a plan view of an assembling apparatus according to an embodiment of the present invention.

An assembling apparatus A according to an embodiment of the present invention will be described with reference to the accompanying drawings. Note that in the drawings, arrows X and Y represent horizontal directions orthogonal to each other, and an arrow Z represents a vertical direction. FIG. 1 is a plan view schematically showing the assembling apparatus A. The assembling apparatus A is an apparatus that assembles a retainer to a valve of a cylinder head 100 via a pair of cotter pieces. The number of cylinders, the cylinder arrangement, and the number of valves of the cylinder head 100 are not limited. The cylinder head 100 according to this embodiment exemplarily includes three cylinders arranged in a straight line and 12 valves (four valves per cylinder).

The assembling apparatus A includes a conveying unit 1, a support device 2, a cotter supplier 3, a retainer supplier 4, a moving unit 5, a plurality of retainer assembling heads 6, and a plurality of cotter assembling heads 7.

The conveying unit 1 conveys the cylinder head 100. The cylinder head 100 is placed on a palette 160 and conveyed. In this embodiment, the conveying unit 1 includes two conveyor units 10. Each conveyor unit 10 is, for example, a roller conveyor and extends in the X direction. The conveying unit 1 forms a conveying line in the X direction. The palette 160 is placed across the two conveyor units 10, and the cylinder head 100 is conveyed in the X direction.

The support device 2 lifts up the cylinder head 100 from the conveyor units 10 and supports the cylinder head 100 during an assembling operation. Details will be described later.

The cotter supplier 3 is a mechanism that supplies a pair of cotter pieces to each cotter assembling head 7. The retainer supplier 4 is a mechanism that supplies a retainer to each assembling head 6. In this embodiment, the retainer supplier 4 is arranged on one side (the right side in FIG. 1)

of the conveying line of the conveying unit 1 in the Y direction, and the cotter supplier 3 is arranged on the other side (the left side in FIG. 1) in the Y direction. This makes it possible to perform assembly of the retainer and the assembly of the pair of cotter pieces alternately from one side and the other side of the cylinder head 100 or at overlapping timings without causing interference, thereby improving the tact time.

The moving unit 5 is a device that independently moves the plurality of retainer assembling heads 6 and the plurality of cotter assembling heads 7. In this embodiment, the moving unit 5 is a gantry-type mechanism, and forms a unit that moves the plurality of retainer assembling heads 6 and a unit that moves the plurality of cotter assembling heads 7, which share some components.

The moving unit 5 includes a horizontal moving unit 50 and elevating units 55a and 55b. The horizontal moving unit 50 includes a pair of rails 51 that are spaced apart in the X direction and arranged in parallel. Each rail 51 extends in the Y direction. The rails 51 are shared by the unit that moves the plurality of retainer assembling heads 6 and the unit that moves the plurality of cotter assembling heads 7. However, the rails 51 may individually be provided.

Each rail 51 is provided with two sliders 52a and 52b capable of independently moving. The sliders 52a and 52b engage with the rails 51 and can move along the rails 51. A rail 53a is provided between the two sliders 52a. A rail 53b is provided between the two sliders 52b. The rails 53a and 53b extend in the X direction.

A slider 54a is provided on the rail 53a. The slider 54a engages with rail 53a and can move along the rail 53a. Similarly, a slider 54b is provided on the rail 53b. The slider 54b engages with rail 53b and can move along the rail 53b.

The horizontal moving unit 50 includes a driving mechanism (not shown) that moves the sliders 52a, 52b, 54a, and 54b. The driving mechanism includes, for example, a driving source such as a motor and a driving force transmission mechanism such as a ball screw mechanism.

Figure 5:
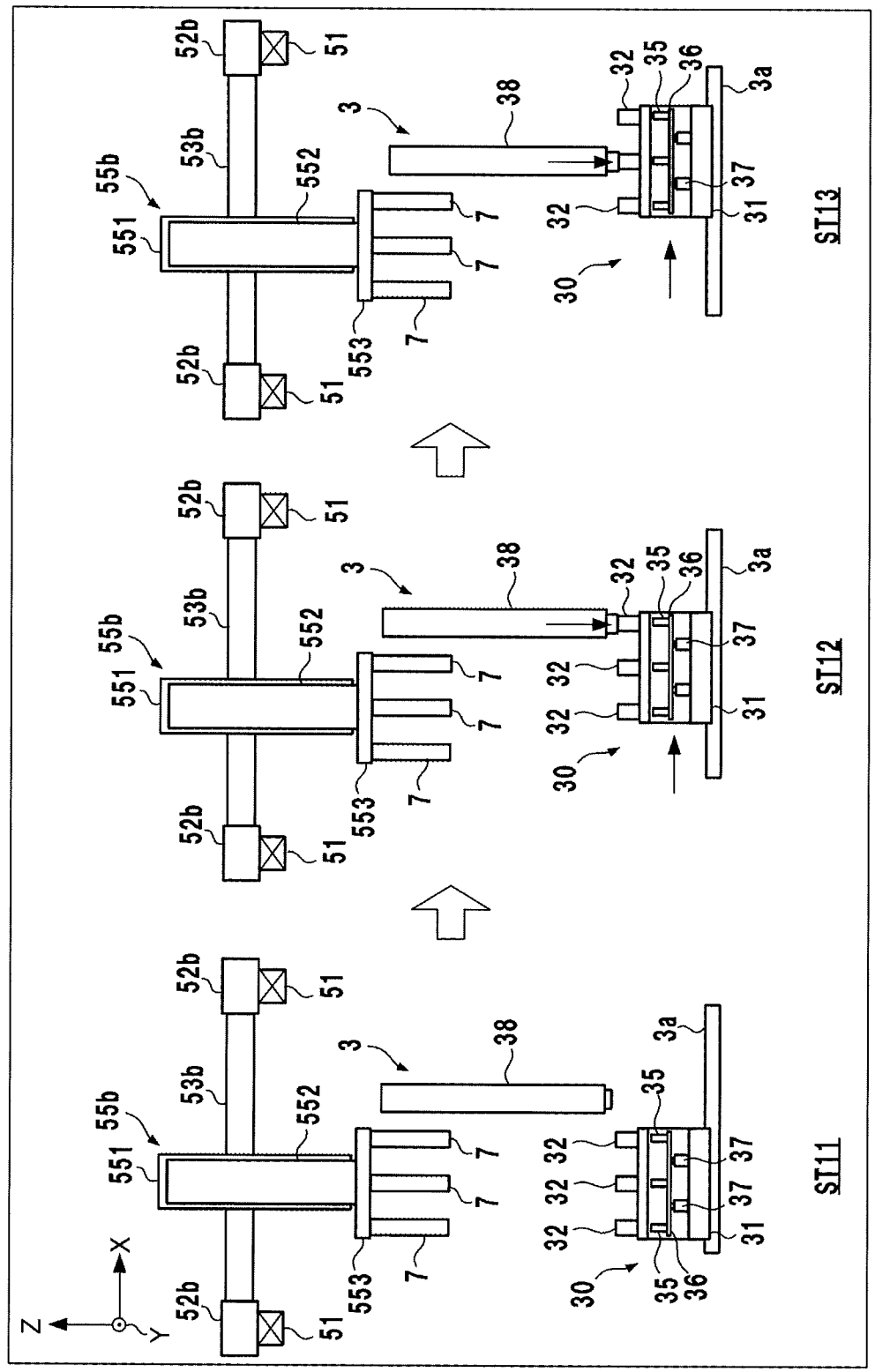
FIG. 5 is an explanatory view of a cotter supplier.

The elevating unit 55a is provided for the slider 54a, and the elevating unit 55b is provided for the slider 54b. As shown in FIG. 5, each of the elevating units 55a and 55b includes a main body 551 fixed to a corresponding one of the sliders 54a and 54b, an elevating member 552 to be raised/lowered in the Z direction, and a head support member 553. The main body 551 is provided with a driving mechanism (for example, a driving source such as a motor and a driving force transmission mechanism such as a ball screw mechanism) that moves the elevating member 552 in the Z direction The head support member 553 is fixed to the lower end of the elevating member 552. The head support member 553 of the elevating unit 55a is provided with the plurality of retainer assembling heads 6. In this embodiment, three retainer assembling heads 6 are arranged in a line in the X direction. The head support member 553 of the elevating unit 55b is provided with the plurality of cotter assembling heads 7. In this embodiment, six cotter assembling heads 7 are provided. The six cotter assembling heads 7 are arranged in two lines in the Y direction. In each line, three cotter assembling heads 7 are arranged in a line in the X direction.

With the above arrangement, all retainer assembling heads 6 are moved in the horizontal direction (the X and Y directions) by the two sliders 52a, the rail 53a, and the slider 54a, and moved in the Z direction by the elevating unit 55a. All cotter assembling heads 7 are moved in the horizontal direction (the X and Y directions) by the two sliders 52b, the rail 53b, and the slider 54b, and moved in the Z direction by the elevating unit 55b.

Each retainer assembling head 6 places a retainer supplied by the retainer supplier 4 on a valve spring. Each cotter assembling head 7 engages a pair of cotter pieces with the upper end of a valve stem to assemble the retainer. Details will be described later.

Control Unit

Figure 2:
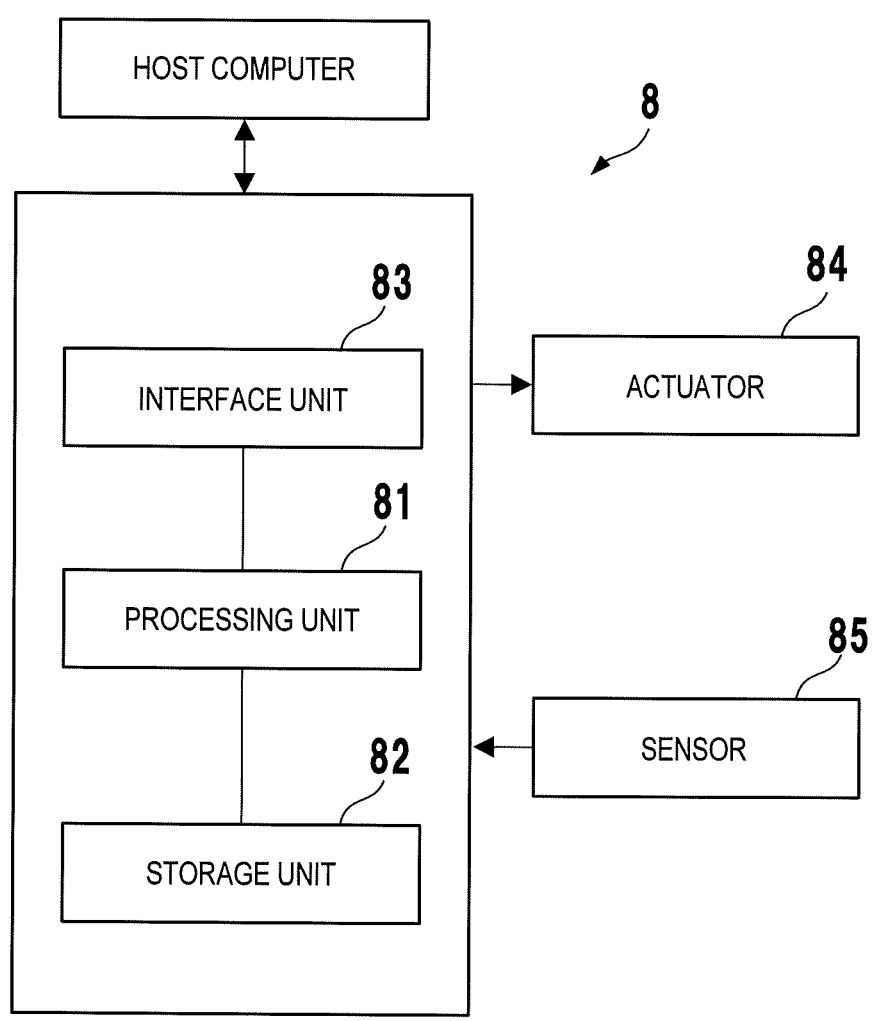
FIG. 2 is a block diagram of the control unit of the assembling apparatus shown in FIG. 1.

The arrangement of a control unit 8 of the assembling apparatus A will be described next with reference to FIG. 2. FIG. 2 is a block diagram of the control unit 8. The control unit 8 includes a processing unit 81, a storage unit 82, and an interface unit 83, which are connected to each other via a bus (not shown). The processing unit 81 executes a program stored in the storage unit 82. The processing unit 81 is, for example, a CPU. The storage unit 82 is, for example, a RAM, a ROM, or a hard disk. The interface unit 83 is provided between the processing unit 81 and external devices (a host computer, a sensor 85, and an actuator 84). The interface unit 83 is, for example, a communication interface or an I/O interface. The host computer is a control apparatus that controls the whole production facility in which the assembling apparatus A is provided.

The actuator 84 is, for example, a motor or a solenoid included in the assembling apparatus A. The sensor 85 is, for example, a sensor that detects the operations of various movable bodies included in the assembling apparatus A.

Details of each component of the assembling apparatus A and an operation under the control of the control unit 8 will be described below.

Support Device

Figure 3:
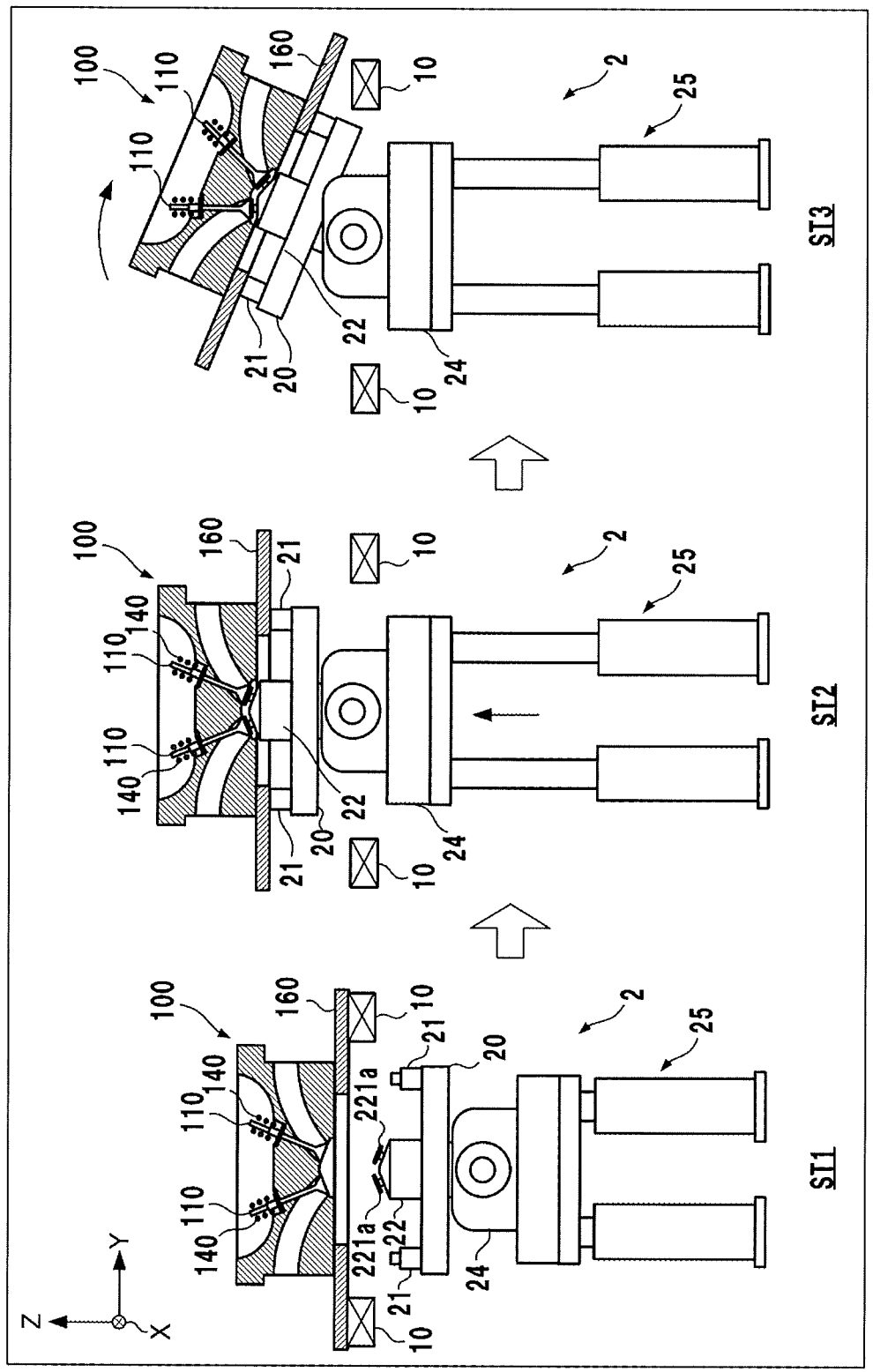
FIG. 3 is an explanatory view of a support device.

The support device 2 supports the cylinder head 100 during the assembling operation. FIG. 3 is an explanatory view of the arrangement and operation of the support device 2. The support device 2 includes a table 20. A plurality of positioning pins 21 and a valve support unit 22 are fixed on the table 20. The table 20 is supported by a pivot unit 24. The pivot unit (tilt unit) 24 is a device that supports the table 20 pivotally about an axis parallel to the X direction and includes a driving mechanism (not shown) that makes the table 20 pivot. The driving mechanism can be formed from, for example, a driving source such as a motor and a gear mechanism (for example, a worm gear mechanism).

The pivot unit 24 is supported by an elevating unit 25. The elevating unit 25 includes, for example, an actuator such as an electric cylinder or an air cylinder, and raises/lowers the pivot unit 24 in the Z direction.

The operation of the support device 2 will be described. Referring to FIG. 3, a state ST1 shows a standby state before the assembling operation. The table 20 and the pivot unit 24 are located at positions lower than the conveying surfaces of the conveyor units 10.

The cylinder head 100 to which the valve stems and valve springs 140 of valves 110 are assembled is conveyed above the support device 2 by the conveyor units 10 and stopped.

Figure 14:
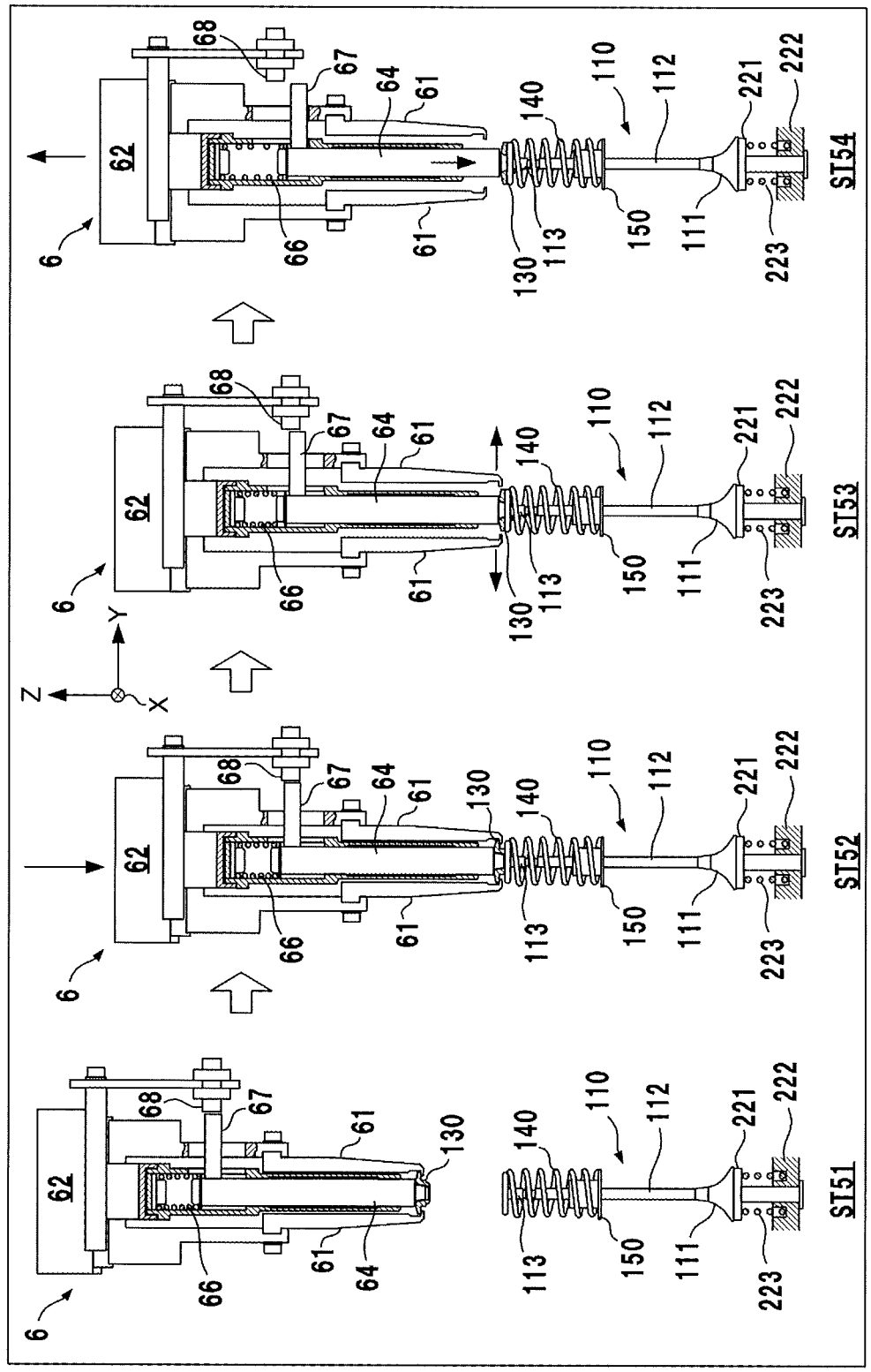
FIG. 14 is an explanatory view of the retainer assembling head.

As shown in FIG. 14 and the like, the valve 110 includes a valve stem 112 and a valve head 111 provided at the lower end of the valve stem 112. A spring sheet 150 to be mounted on the cylinder head 100 and the valve spring 140 are set on the valve stem 112. The valve spring 140 is provided on the spring sheet 150 while surrounding the upper end of the valve stem 112. As shown in FIG. 25 and the like, an engaging portion 114 to be engaged with a pair of cotter pieces 120 is formed at an upper end 113 of the valve stem 112. The assembling apparatus A finally assembles a retainer 130 to the upper end 113 via the pair of cotter pieces 120.

Referring back to FIG. 3, the elevating unit 25 is driven to raise the table 20 and the pivot unit 24, as indicated by a state ST2. In the process of raising of the table 20, the plurality of positioning pins 21 engage with the palette 160, and the cylinder head 100 is lifted up from the conveyor units 10 together with the palette 160. The operation of assembling the retainer and the pair of cotter pieces is performed in a state in which the cylinder head 100 is thus lifted up from the conveyor units 10. The valve support unit 22 abuts against the valves 110 to prevent the valves 110 from dropping off to the combustion chamber side during the assembling operation and also manage the positions of the valves 110 during the assembling operation. Details will be described later.

Normally, the valve 110 on the intake side and the valve 110 on the exhaust side are not parallel to each other. In this embodiment, the operation of assembling the retainer 130 and the pair of cotter pieces 120 is performed in a state in which the valve stem of the valve 110 is parallel to the Z direction (the valve stem is directed vertically upward). Hence, the table 20 is made to pivot (tilted) by the pivot unit 24, as indicated by a state ST3. By the pivotal movement, for example, the valves 110 on the intake side are first set parallel to the Z direction. When the assembling operation for the valves 110 on the intake side is completed, the valves 110 on the exhaust side are set parallel to the Z direction.

Figure 4:
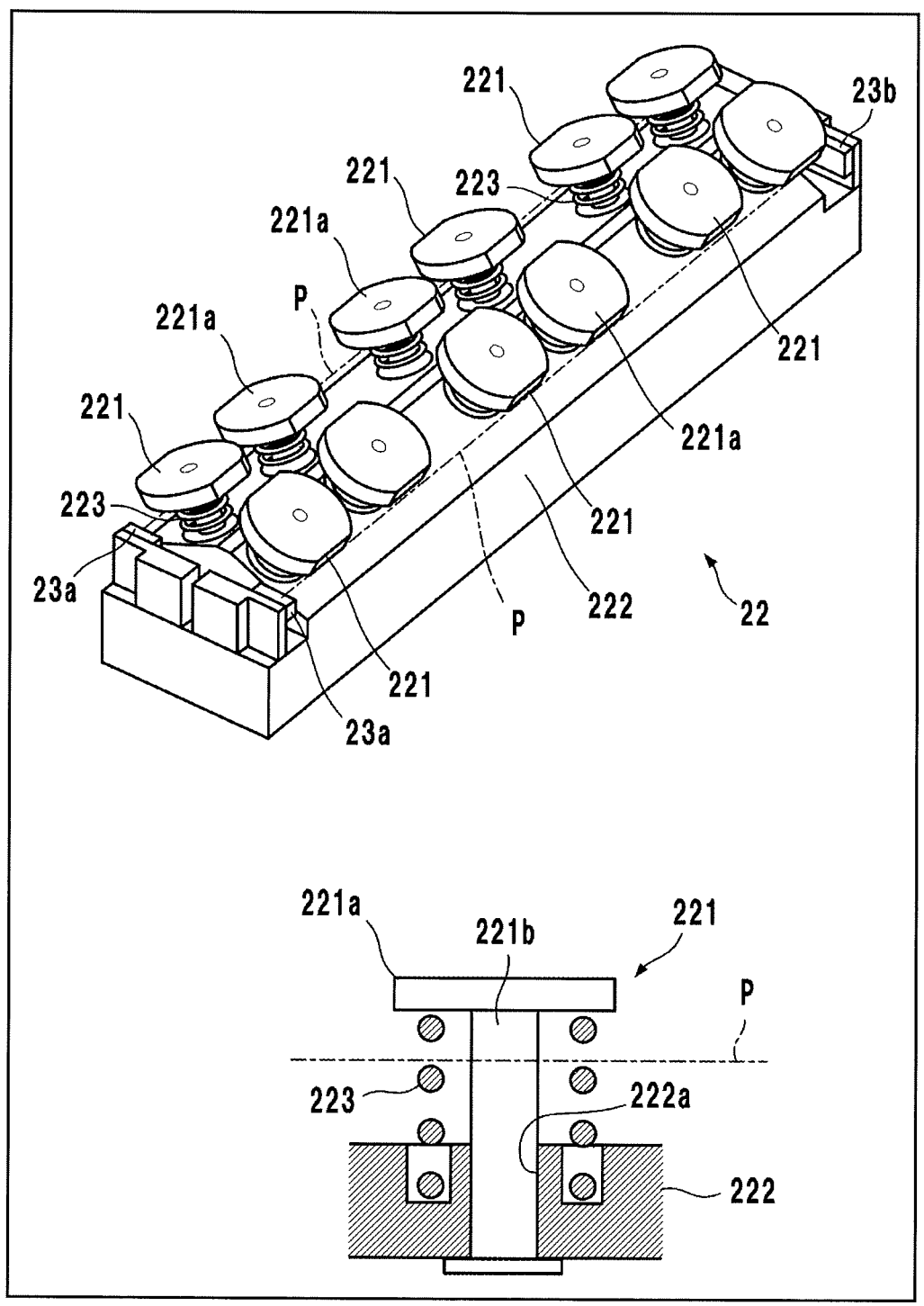
FIG. 4 is an explanatory view of a valve support unit.

FIG. 4 shows a perspective view and a sectional view of the valve support unit 22. The valve support unit 22 is a device that abuts against the valve heads 111 provided at the lower ends of the valve stems 112 and presses the valve stems 112 upward while permitting the downward movement of the valve stems 112 during the assembling operation. The valve support unit 22 includes a plurality of abutting members 221.

The abutting member 221 is provided for each valve 110. Hence, in this embodiment, there are 12 abutting members 221. The abutting member 221 includes a plate-shaped abutting portion 221a that abuts against the valve head 111, and a shaft portion 221b extending from the center of the abutting portion 221a.

The valve support unit 22 also includes a support member 222 that movably supports the abutting members 221. The support member 222 includes, for each abutting member 221, a hole 222a in which the shaft portion 221b is inserted. The abutting member 221 is supported to be movable in the axial direction of the shaft portion 221b. As indicated by the state ST2 or state ST3 in FIG. 3, when the support device 2 is supporting the cylinder head 100, the shaft portion 221b is located coaxially with the valve stem 112.

An elastic member 223 is provided between each abutting portion 221a and the support member 222. In this embodiment, the elastic member 223 is a coil spring. The elastic member 223 is provided for each abutting portion 221a and surrounds the shaft portion 221b. The elastic member 223 biases the abutting member 221 to the side of the valve 110. That is, the elastic member 223 biases the valve 110 upward (to the closing direction). This absorbs and relaxes a downward force acting on the valve 110 while allowing the valve 110 to move downward.

The valve support unit 22 is provided with two sets of sensors 23a and 23b configured to detect the downward moving amount of the valve stems 112. In this embodiment, the two sets of sensors 23a and 23b are provided on the support member 222. However, they may be provided on another portion.

In this embodiment, the sensors 23a and 23b form a photosensor unit in which one sensor is a light-emitting element, and the other is a light-receiving element, and the optical axis of the light-emitting element is a detection position P. If an object exists on the detection position P, light from the light-emitting element does not reach the light-receiving element, and the presence of the object is detected.

One set of sensors 23a and 23b is provided for each line of the abutting members 221, in other words, on each of the intake side and the exhaust side of the valves 110. Hence, one set of sensors 23a and 23b monitor the positions of the six abutting members 221.

The detection position P is set at a position between the abutting portion 221a and the support member 222 in the initial state. If the valve 110 moves downward to move the abutting member 221 downward, the abutting portion 221a is located on the detection position P, and the sensors 23a and 23b detect it. The detection position P is set such that the sensors 23a and 23b detect the movement of the valve 110 when it moves downward by a predetermined amount. The detection result of the sensors 23a and 23b is used in the assembling operation by the cotter assembling heads 7.

Note that although a photosensor unit is used in this embodiment, another sensor (for example, a mechanical sensor) may be used. The sensor may be provided for each abutting member 221 (for each valve 110).

Cotter Supplier

Figure 6:
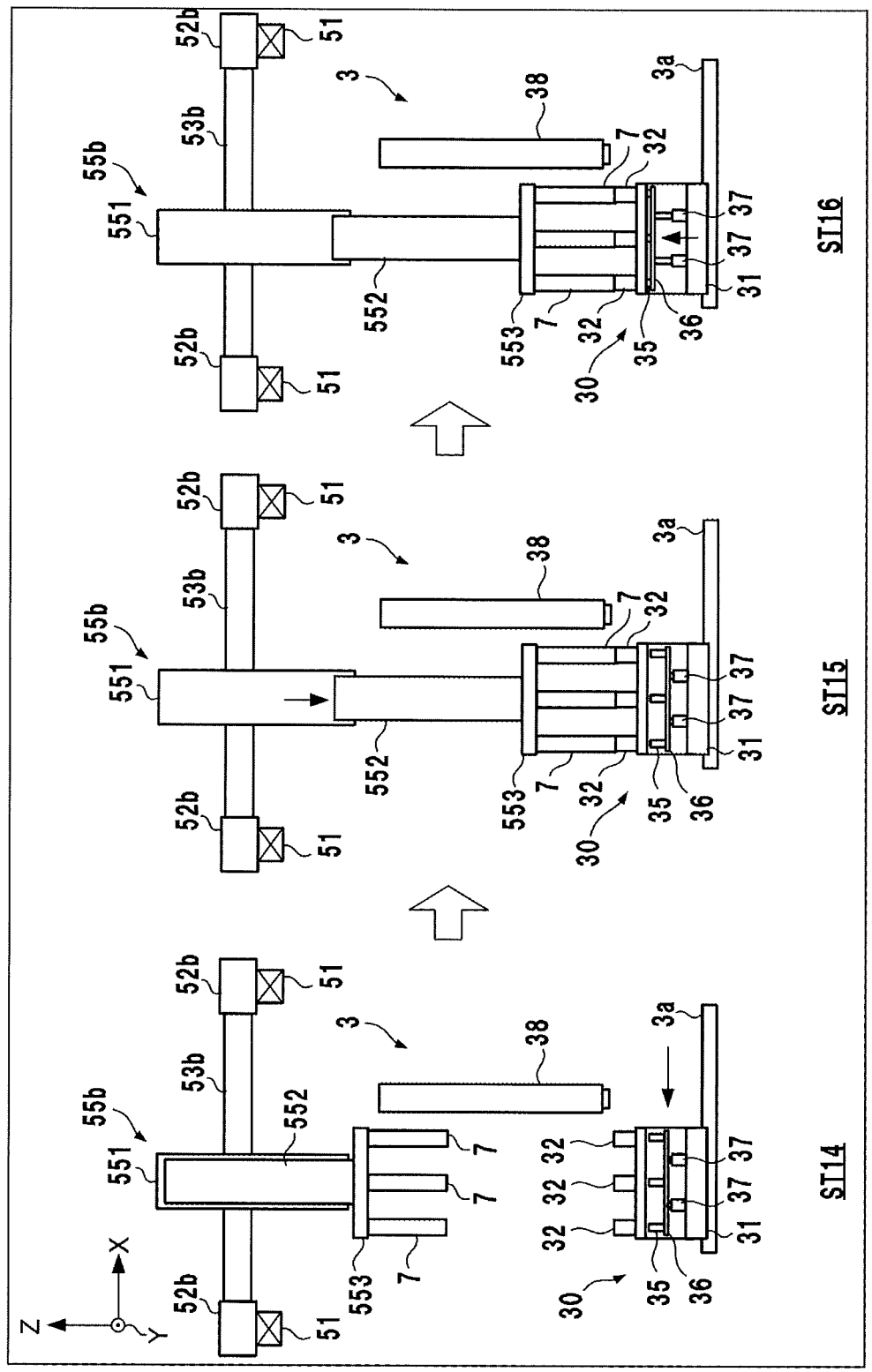
FIG. 6 is an explanatory view of the cotter supplier.
Figure 7:
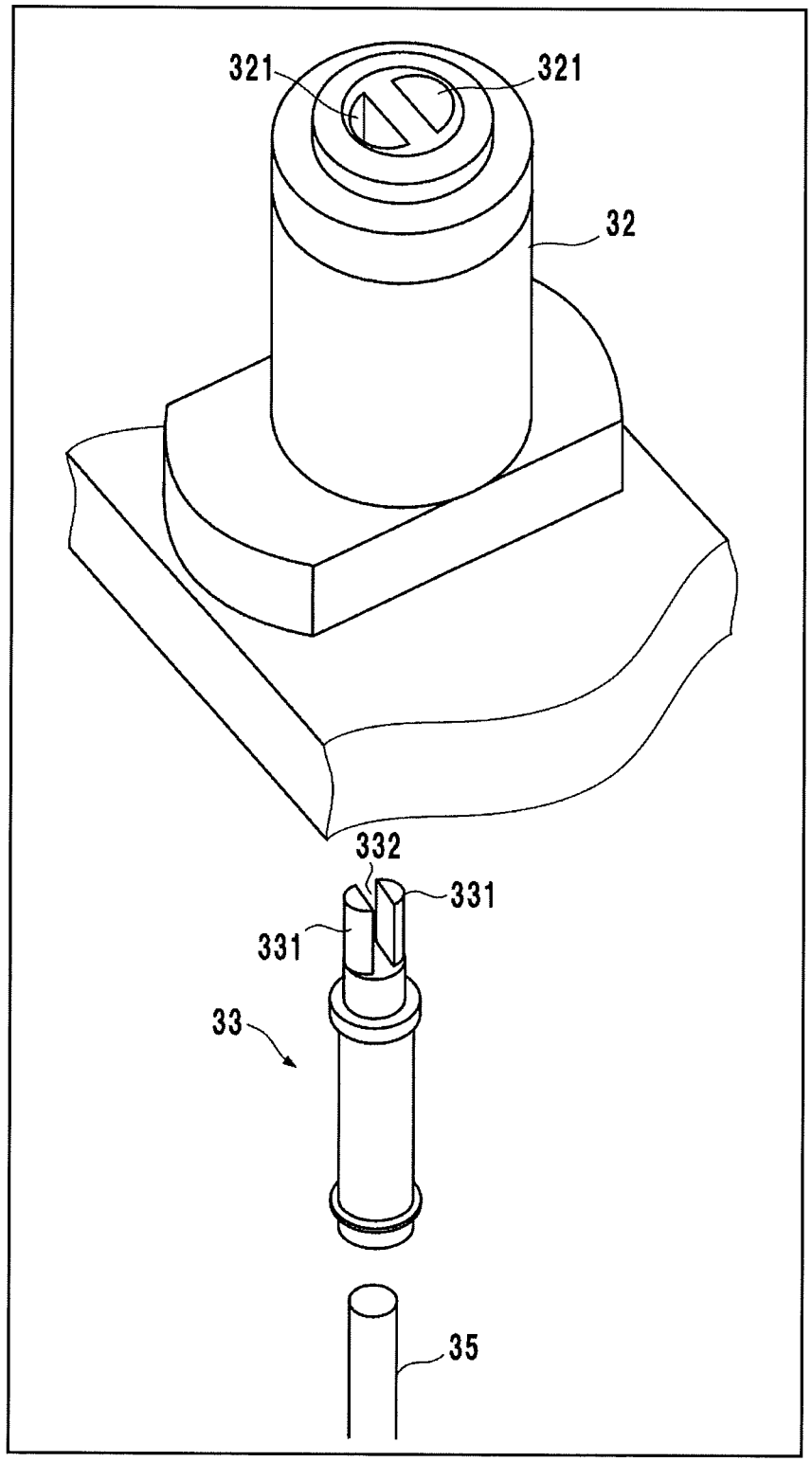
FIG. 7 is an explanatory view of a cotter piece preparation unit.
Figure 8:
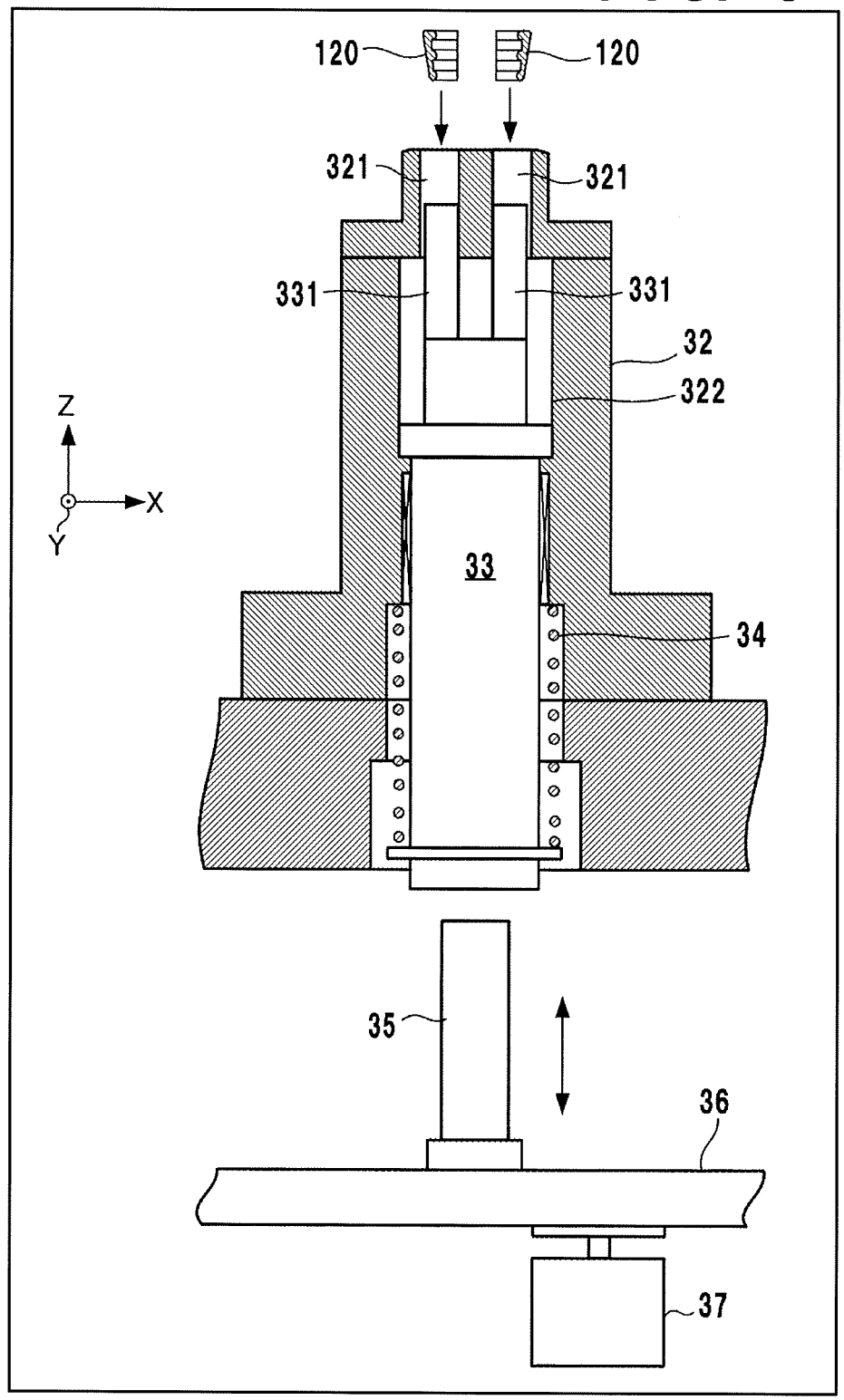
FIG. 8 is an explanatory view of the cotter piece preparation unit.

The cotter supplier 3 will be described with reference to FIGS. 5 to 8. FIGS. 5 and 6 are elevation views showing the cotter supplier 3, the cotter assembling heads 7, and the moving unit 5 concerning the movement of the cotter assembling heads 7. FIG. 7 is an exploded perspective view of a part of a preparation unit 30 of the cotter supplier 3, and FIG. 8 is a sectional view of a part of the preparation unit 30.

The cotter supplier 3 includes the preparation unit 30 and a supply unit 38. The preparation unit 30 is a device that prepares the pair of cotter pieces 120 in a separated state with a gap capable of passing the upper end 113 of the valve stem 112. The supply unit 38 is a unit that loads the pair of cotter pieces 120 on the preparation unit 30.

The preparation unit 30 includes a moving body 31. The moving body 31 is engaged with a rail 3a extending in the X direction and guided, and can be moved in the X direction by a driving mechanism (not shown). The driving mechanism is, for example, a ball screw mechanism or a rack-and-pinion mechanism using a motor as a driving source. When the moving body 31 moves, the preparation unit 30 moves between a receiving position to receive supply of the pair of cotter pieces 120 from the supply unit 38 and a discharge position to supply the pair of cotter pieces 120 to the cotter assembling head 7. The receiving position is the position indicated by a state ST12 or state ST13 in FIG. 5. The discharge position is the position indicated by states ST14 to ST16 in FIG. 6.

A plurality of storages 32 each configured to store the pair of cotter pieces 120 are mounted on the moving body 31. In this embodiment, three storages 32 are provided in the X direction, and the arrangement of the storages 32 corresponds to the arrangement of the cotter assembling heads 7 in the X direction.

A plurality of driving pins 35 and a support plate 36 that supports the plurality of driving pins 35 are provided under the storages 32. The driving pin 35 is provided for each storage 32. The moving body is also provided with a plurality of elevating units 37 configured to raise/lower the support plate 36.

Referring to FIGS. 6 and 7, the storage 32 is a tubular member. A pair of semicircular columnar storage holes 321 that store the pair of cotter pieces 120 in a separated state are formed in the top.

The storage 32 also has a shaft hole 322 formed in the Z direction and communicating with the storage holes 321. A lifting member 33 is stored in the shaft hole 322. A groove 332 is formed at the upper end of the lifting member 33. A pair of lifting portions 331 branched into two parts are thus formed. Each lifting portion 331 is a columnar body having a semicircular section capable of entering the corresponding storage hole 321.

An elastic member 34 is provided between the lifting member 33 and the storage 32. In this embodiment, the elastic member 34 is a coil spring. The coil spring biases the lifting member 33 downward. When the lifting member 33 is located on the lower side, the pair of cotter pieces 120 can be inserted into the pair of storage holes 321.

The driving pin 35 is arranged coaxially with the lifting member 33. When the elevating units 37 are driven to raise the driving pins 35, each lifting member 33 is lifted up. Accordingly, the lifting member 33 rises against the biasing of the elastic member 34, and the lifting portions 331 of the lifting member 33 lift up the pair of cotter pieces 120 stored in the pair of storage holes 321.

An operation of loading the pair of cotter pieces 120 from the supply unit 38 to the preparation unit 30 will be described with reference to FIG. 5. A state ST11 shows the initial state. The driving pins 35 are located at the lowering position. Hence, the lifting member 33 is located on the lower side, as shown in FIG. 8, and the pair of storage holes 321 are in a state capable of storing the pair of cotter pieces 120.

Next, the preparation unit 30 is moved to the receiving position. In this embodiment, the three storages 32 are sequentially made to face the supply unit 38, and the pair of cotter pieces 120 is supplied. However, a plurality of supply units 38 may be provided to supply pairs of cotter pieces 120 to the plurality of storages 32 simultaneously.

The state ST12 shows a state in which one (the storage 32 at the right end in FIG. 5) of the three storages 32 is made to face the supply unit 38 to load the pair of cotter pieces 120 to the pair of storage holes 321. The supply unit 38 drops or pushes out the pair of cotter pieces 120 from above the storage 32, thereby loading the pair of cotter pieces 120 to the pair of storage holes 321.

Subsequently, the preparation unit 30 is moved to store the pair of cotter pieces 120 in another storage 32. The state ST13 shows a state in which another (the storage 32 at the center in FIG. 5) of the three storages 32 is made to face the supply unit 38 to load the pair of cotter pieces 120 to the pair of storage holes 321. The pairs of cotter pieces 120 are thus loaded to all storages 32.

With the above procedure, a plurality of sets of pairs of cotter pieces 120 are prepared in the separated state. The operation then shifts to an operation of discharging (supplying) the pairs of cotter pieces 120 to the cotter assembling heads 7. This operation will be described with reference to FIG. 6.

First, the preparation unit 30 is moved to the discharge position (cotter supply position). The state ST14 shows a state in which the preparation unit 30 moves to the discharge position. As for the positional relationship, the three storages 32 and three cotter assembling heads 7 of the total of six cotter assembling heads 7 face each other in the Z direction.

Next, as shown in the state ST15, the elevating unit 55b lowers the three cotter assembling heads 7 to a position at which the pairs of cotter pieces 120 can be received. Continuously, as shown in the state ST16, the elevating units 37 are driven to raise the driving pins 35 and lift up the lifting members 33. Accordingly, the three sets of pairs of cotter pieces 120 stored in the three storages 32 are pushed out to the three cotter assembling heads 7 while keeping the separated state. The three cotter assembling heads 7 hold the pushed pairs of cotter pieces 120 in the separated state.

The pairs of cotter pieces 120 are thus supplied to the three cotter assembling heads 7. In this embodiment, since there are six cotter assembling heads 7, the operations shown in FIGS. 5 and 6 are repeated twice, thereby supplying the pairs of cotter pieces 120 to all the six cotter assembling heads 7.

Retainer Supplier

Figure 9:
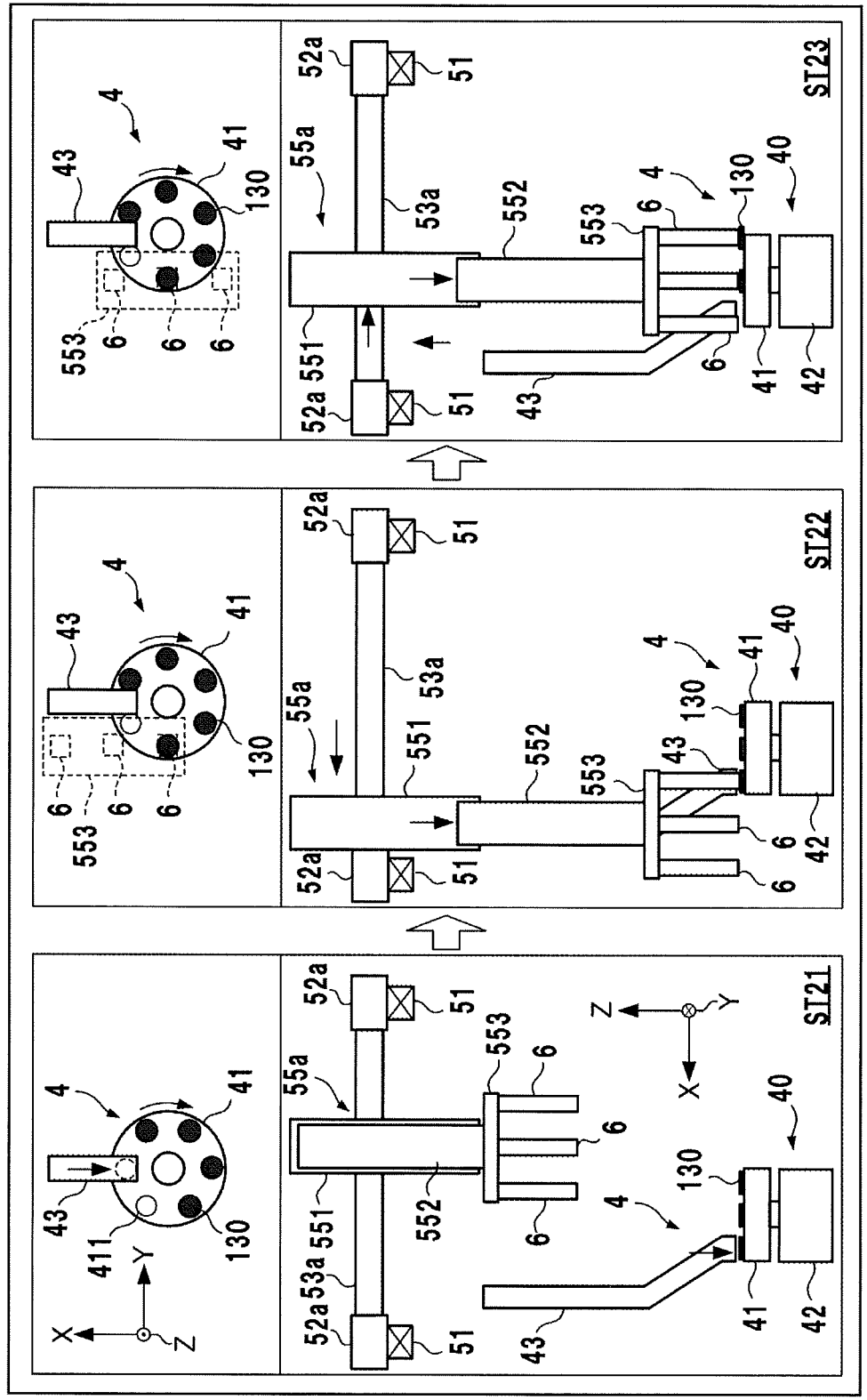
FIG. 9 is an explanatory view of a retainer supplier.

The retainer supplier 4 will be described with reference to FIG. 9. FIG. 9 shows a plan view of the retainer supplier 4 and an elevation view of the retainer assembling heads 6 and the moving unit 5 concerning the movement of the retainer assembling heads 6.

The retainer supplier 4 includes a preparation unit 40 and a supply unit 43. The preparation unit 40 is a device configured to prepare the retainers 130 such that the retainer assembling heads 6 can hold them. The supply unit 43 is a unit configured to load the retainers 130 to the preparation unit 40.

The preparation unit 40 includes a turntable 41 and a driving unit 42 that rotates the turntable 41. The turntable 41 is a disc-shaped member and can rotate about an axis parallel to the Z direction. A plurality of placement portions 411 are arranged on the turntable 41 at equal pitches in the circumferential direction. In this embodiment, the placement portions 411 are concave portions on which the retainers 130 are placed. In FIG. 9, the placement portions 411 on which the retainers 130 are placed are gray-colored, and the placement portions 411 on which the retainers 130 are not placed are open. The driving unit 42 is formed from, for example, a motor and a reduction gear.

A state ST21 indicates an operation of loading the retainer 130 from the supply unit 43 to the preparation unit 40. The turntable 41 is intermittently rotated, and the supply unit 43 discharges and places the retainer 130 on the placement portion 411 located immediately under the supply port. The retainers 130 are thus prepared on the placement portions 411.

An operation of extracting the retainer 130 by each retainer assembling head 6 will be described next. First, the retainer assembling heads 6 are moved to the supply position to receive the supply of the retainer 130. As for the positional relationship, the retainer assembling head 6 that receives the supply of the retainer 130 first in the three retainer assembling heads 6 and a predetermined portion of the turntable 41 face each other in the Z direction. The rotation of the turntable 41 stops, the elevating unit 55a lowers all the retainer assembling heads 6, as shown in a state ST22, and the retainer assembling head 6 that receives the supply of the retainer 130 first extracts the retainer 130 from the placement portion 411.

Next, the elevating unit 55a raises all the retainer assembling heads 6 by a predetermined amount. After that, the turntable 41 is rotated to locate the placement portion 411 with the retainer 130 at a predetermined portion, and after that, the retainer assembling head 6 that receives the supply of the retainer 130 next is made to face a predetermined portion of the turntable 41. The elevating unit 55a lowers all the retainer assembling heads 6, as shown in a state ST23, and the retainer assembling head 6 that receives the supply of the retainer 130 next extracts the retainer 130 from the placement portion 411. In this embodiment, since there are three retainer assembling heads 6, the third retainer assembling head 6 also extracts the retainer 130 in accordance with the same procedure as described above. The retainers 130 are thus held by all the retainer assembling heads 6.

Assembling Operation

Figure 10:
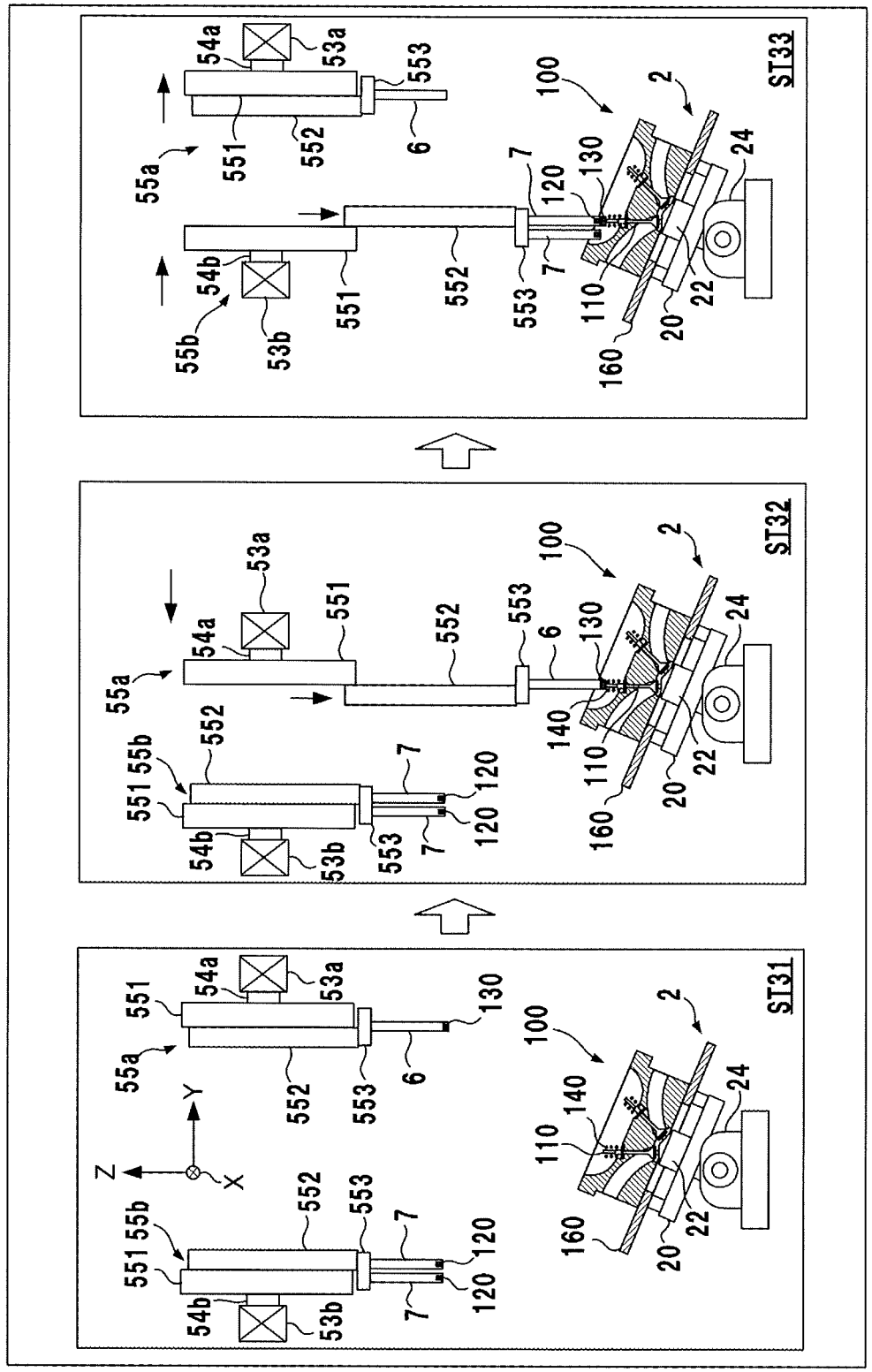
FIG. 10 is an explanatory view of an assembling operation.
Figure 11:
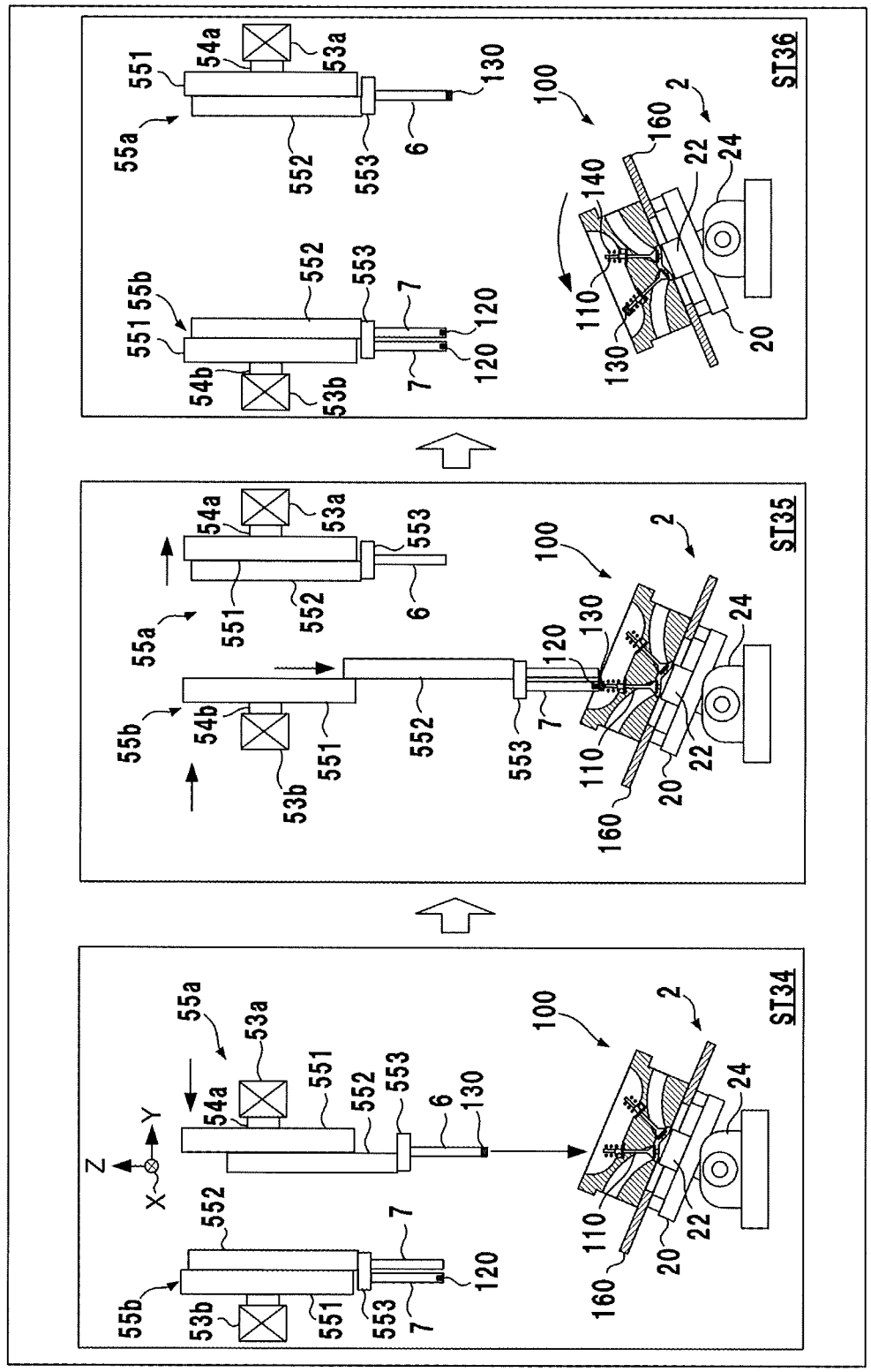
FIG. 11 is an explanatory view of the assembling operation.

The assembling operation of the retainer 130 to the valve stem 112 will be described with reference to FIGS. 10 and 11. To put it briefly, in this embodiment, the retainer assembling head 6 places the retainer 130 on the valve spring 140. After that, the cotter assembling head 7 assembles the retainer 130 to the upper end 113 of the valve stem 112 via the pair of cotter pieces 120.

A state ST31 shows a state in which all the retainer assembling heads 6 hold the retainers 130, and all the cotter assembling heads 7 hold the pairs of cotter pieces 120 in the separated state. The cylinder head 100 is supported on the support device 2 while putting the six valves 110 on one of the intake side and the exhaust side in a posture directed in the Z direction.

Next, as indicated by a state ST32, the moving unit 5 moves the retainer assembling heads 6 to an assembling position. This movement includes an operation of horizontally moving the six retainer assembling heads 6 onto the three valves 110 of the six valves 110 of the assembling target, and an operation of lowering the three retainer assembling heads 6 by the elevating unit 55a and stopping them at a predetermined position. When the retainer assembling heads 6 are lowered and stopped at the predetermined position, the retainers 130 are placed on the valve springs 140, as will be described later in detail.

Next, as indicated by a state ST33, the moving unit 5 moves the retainer assembling heads 6 to the supply position to supply the new retainers 130. In addition, the moving unit 5 moves the cotter assembling heads 7 to the assembling position. This movement includes an operation of horizontally moving three cotter assembling heads 7 of the six cotter assembling heads 7 onto the three valves 110 on which the retainers 130 are placed, and an operation of lowering the three cotter assembling heads 7 by the elevating unit 55b and stopping them at a predetermined position. When the cotter assembling heads 7 are lowered and stopped at the predetermined position, the retainers 130 are assembled the valve stems 112 via the pairs of cotter pieces 120. The assembling operation for the three valves 110 of the six valves 110 of the assembling target is thus completed.

Next, the assembling operation of the retainers 130 to the remaining three valves 110 of the six valves 110 of the assembling target is performed. As indicated by a state ST34, the moving unit 5 temporarily retracts the cotter assembling heads 7. The moving unit 5 moves the retainer assembling heads 6 that have received the supply of the retainers 130 to the assembling position. This movement includes an operation of horizontally moving the three retainer assembling heads 6 onto the remaining three valves 110 of the assembling target, and an operation of lowering the three retainer assembling heads 6 by the elevating unit 55b and stopping them at a predetermined position. When the retainer assembling heads 6 are lowered and stopped at the predetermined position, the retainers 130 are placed on the valve springs 140.

Next, as indicated by a state ST35, the moving unit 5 moves the retainer assembling heads 6 to the supply position to supply the new retainers 130 to the retainer assembling heads 6. In addition, the moving unit 5 moves the cotter assembling heads 7 to the assembling position. This movement includes an operation of horizontally moving three cotter assembling heads 7 holding the pairs of cotter pieces 120 in the six cotter assembling heads 7 onto the three valves 110 on which the retainers 130 are placed, and an operation of lowering the three cotter assembling heads 7 by the elevating unit 55a and stopping them at a predetermined position. When the cotter assembling heads 7 are lowered and stopped at the predetermined position, the retainers 130 are assembled the valve stems 112 via the pairs of cotter pieces 120. The assembling operation for the six valves 110 on one of the intake side and the exhaust side is thus completed.

Next, the assembling operation for the six valves 110 on the other of the intake side and the exhaust side is started. As indicated by a state ST36, the pivot unit 24 makes the cylinder head 100 pivot, and puts the six valves 110 on the other of the intake side and the exhaust side in a posture directed in the Z direction. In addition, each retainer assembling head 6 holds the retainer 130, and each cotter assembling head 7 holds the pair of cotter pieces 120. The same state as the state ST31 is thus obtained. The assembling operation for the six valves 110 on the other of the intake side and the exhaust side is then performed in accordance with the above-described procedure.

Retainer Assembling Head

Figure 12:
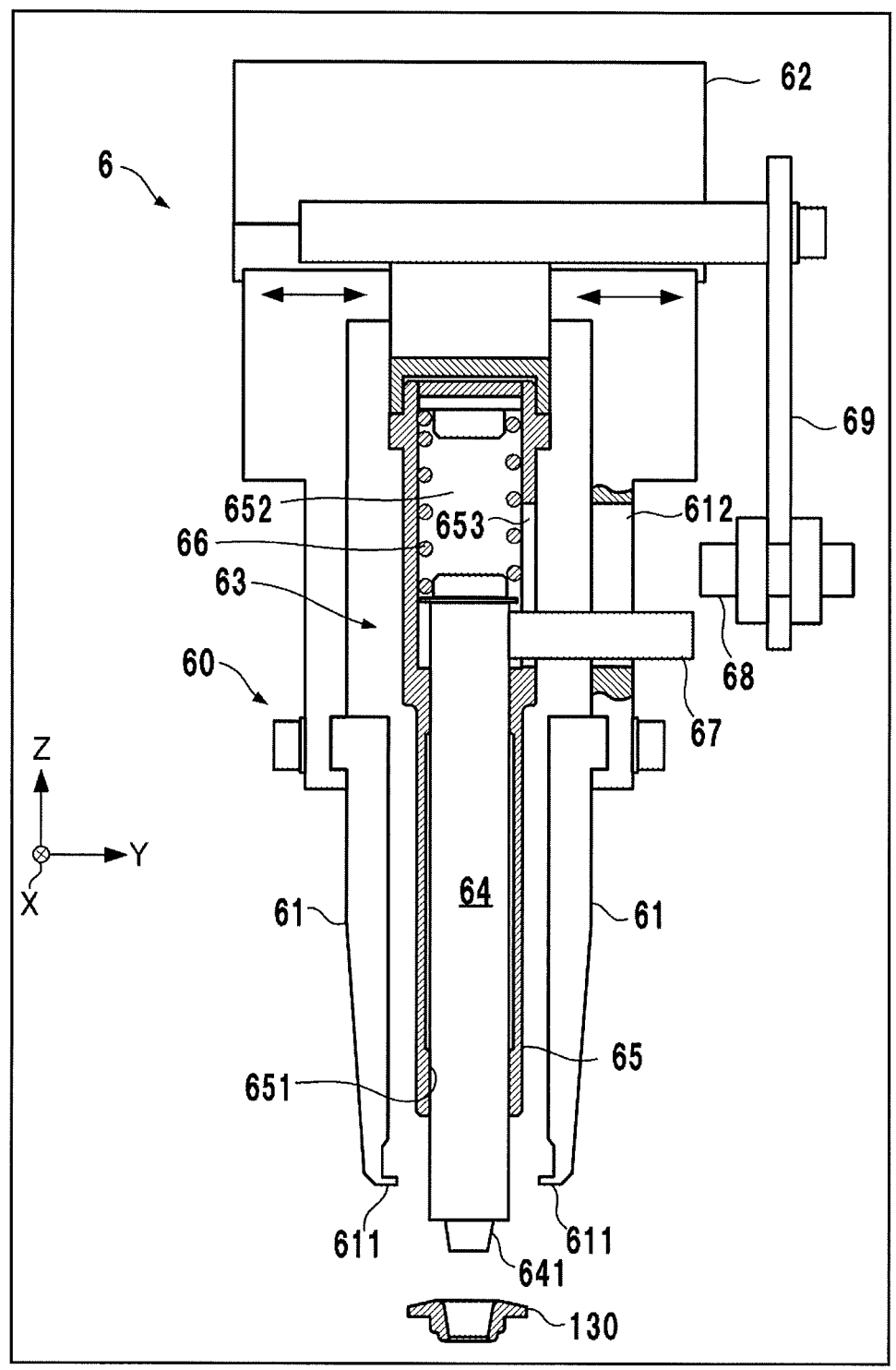
FIG. 12 is an explanatory view of a retainer assembling head.

The retainer assembling head 6 will be described with reference to FIGS. 12 to 15. The structure of the retainer assembling head 6 will be described first with reference to FIG. 12. FIG. 12 is a sectional or cutaway view of a part of the retainer assembling head 6.

The retainer assembling head 6 includes a holding unit 60 that holds the retainer 130, and a push unit 63 that pushes out the retainer 130 held by the holding unit 60. The holding unit 60 includes a plurality of holding members 61, and a driving unit 62 that opens/closes the plurality of holding members 61. The push unit 63 includes a push member 64, a support member 65 that supports the push member 64 such that it can advance/retreat along the elevating direction of the retainer assembling head 6, that is, the Z direction, and a biasing unit 66.

In this embodiment, two holding members 61 are provided. However, three or more holding members 61 may be provided. Each holding member 61 is an arm-shaped member extending in the Z direction. The two holding members 61 are arranged in parallel so as to face each other in the Y direction. The two holding members 61 are provided around the push member 64, and the push member 64 is located in the middle between the two holding members 61 apart in the Y direction.

An abutting portion 611 that can abut against the peripheral portion of the retainer 130 is formed at the lower end of each holding member 61. The abutting portion 611 forms an L-shaped pawl and abuts against the side and lower surfaces of the flange portion of the retainer 130. In other words, the flange portion of the retainer 130 is held by the two abutting portions 611. A slit 612 is formed in the halfway portion of each holding members 61 so as to extend through the holding member 61 in the Y direction. A detection piece 67 used to detect the position of the push member 64 is inserted into the slit 612 of one holding member 61.

The driving unit 62 is an actuator configured to open/close the two holding members 61. The two holding members 61 are translated in directions (Y direction) to come close or separate, as indicated by arrows. The driving unit 62 is formed by, for example, an air cylinder, an electric cylinder, or a ball screw mechanism or a rack-and-pinion mechanism using a motor as a driving source.

The push member 64 is a columnar body extending in the Z direction, and has an engaging portion 641 at the lower end. The engaging portion 641 is a projecting portion to be loosely fitted in the hole at the center of the retainer 130, and has a truncated conical shape here.

The support member 65 is a tubular body extending in the Z direction, and a shaft hole 651 extending in the Z direction is formed at the center of the support member 65. The push member 64 is inserted into the shaft hole 651, and its movement in the Z direction is guided. A storage chamber 652 communicating with the shaft hole 651 is formed in the upper portion of the push member 64. The biasing unit 66 is stored in the storage chamber 652.

In this embodiment, the biasing unit 66 is an elastic member, particularly, a coil spring, and is arranged between the top portion of the support member 65 and the upper portion of the push member 64. The biasing unit 66 may include a driving source. However, if an elastic member is used, as in this embodiment, a simple structure can be formed.

The biasing unit 66 biases the push member 64 in the advancing direction (downward in the Z direction) in which the push member 64 comes out of the support member 65. As shown in FIG. 12, when located at the lowermost position, the push member 64 projects to the lower side of the abutting portions 611 at the lower ends of the holding members 61. In other words, when located at the lowermost position, the push member 64 projects to the lower side of the holding position of the retainer 130.

A slit 653 in which the detection piece 67 is inserted is formed in the peripheral wall of the storage chamber 652. The detection piece 67 is a rod member (dog) extending in the horizontal direction (the Y direction in FIG. 12), and one end of the detection piece 67 is fixed to the upper portion of the push member 64.

The retainer assembling head 6 also includes a sensor 68 that detects the position of the push member 64. The sensor 68 is arranged by a sensor support member 69 on a side of one holding member 61. The sensor 68 is a proximity sensor that detects the approach/separation of the dog 67. As the sensor 68, not only the proximity sensor but also a transmission photosensor can be applied. In this case, when the detection piece 67 shields light between the light-emitting element and the light-receiving element, the presence of the detection piece 67 is detected.

Figure 13:
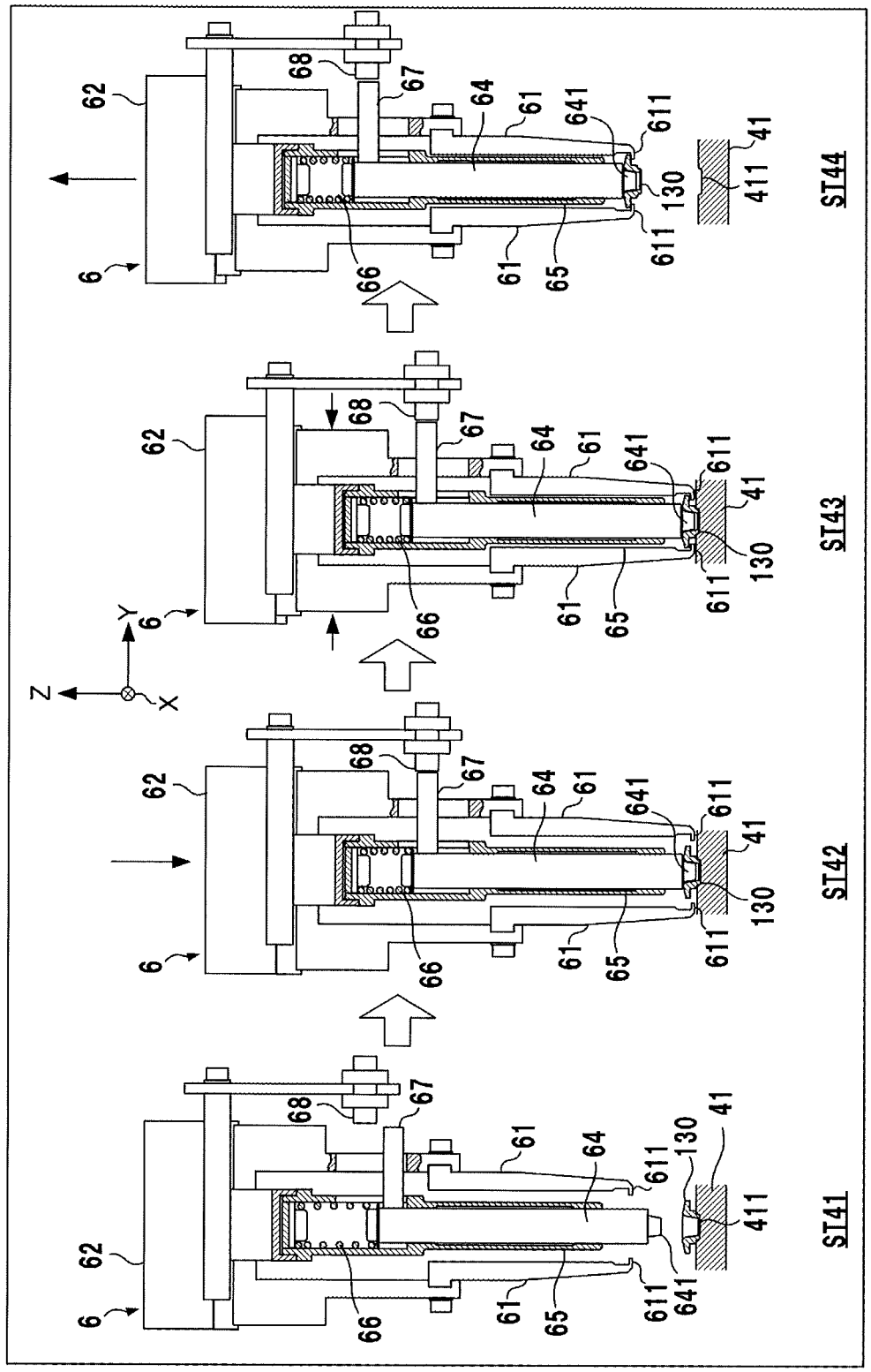
FIG. 13 is an explanatory view of the retainer assembling head.

The operation of the retainer assembling head 6 will be described with reference to FIGS. 13 to 15. FIG. 13 shows an operation (the operation in FIG. 9) of extracting the retainer 130 from the retainer supplier 4 by the retainer assembling head 6.

A state ST41 shows a state in which the retainer assembling head 6 is located on a predetermined position of the turntable 41. The two holding members 61 are located at open positions apart from each other.

When the elevating unit 55a lowers the retainer assembling head 6, the engaging portion 641 of the push member 64 is inserted into the hole at the center of the retainer 130. When the retainer assembling head 6 is further lowered, the push member 64 is pushed into the support member 65 against the biasing of the biasing unit 66.

When the retainer assembling head 6 is further lowered to push the push member 64 into the support member 65, and the detection piece 67 reaches the position at which it is detected by the sensor 68, as indicated by a state ST42, the sensor 68 detects the detection piece 67, and the lowering of the retainer assembling head 6 is stopped.

When the detection piece 67 is detected by the sensor 68, the driving unit 62 moves the two holding members 61 to close positions close to each other, as indicated by a state ST43, and the abutting portions 611 abut against the retainer 130. When the elevating unit 55a raises the retainer assembling head 6, the retainer 130 is extracted from the placement portion 411. The biasing unit 66 contracts in the Z direction. By the elastic force, a force to move (project) downward continuously acts on the push member 64. However, the force to project is restricted when the abutting portions 611 of the holding members 61 hold the flange portion of the retainer 130. The retainer 130 is thus held at the lower end of the retainer assembling head 6. Accordingly, the extraction operation of the retainer 130 is completed.

FIG. 14 shows an operation (the operation of the state ST32 in FIG. 10 and the operation of the state ST34 in FIG. 11) of placing the retainer 130 on the valve spring 140 by the retainer assembling head 6.

A state ST51 shows a state in which the retainer assembling head 6 is located above the assembling position. The push member 64 and the valve stem 112 are located coaxially. As indicated by a state ST52, the retainer assembling head 6 is lowered by the elevating unit 55a to the assembling position and stopped. The elevating height of the retainer assembling head 6 is detected by a sensor (for example, a sensor that detects the position of the elevating member 552) provided in the elevating unit 55a.

Next, as shown in a state ST53, the driving unit 62 moves the two holding members 61 to the open positions apart from each other to cancel the holding of the retainer 130. Accordingly, the elastic force of the biasing unit 66 makes the push member 64 project downward, and the retainer 130 is pushed to the side of the valve spring 140. At this time, the engaging portion 641 of the push member 64 is kept inserted in the hole at the center of the retainer 130, and the holding of the retainer 130 is maintained.

The holding of the retainer 130 is canceled, and at the same time, the elevating unit 55a raises the retainer assembling head 6 from or the assembling position. At this time, although the retainer assembling head 6 is raised, the push member 64 is moved downward by the elastic force of the biasing unit 66. For this reason, the retainer 130 is pushed to the side of the valve spring 140 and placed on the valve spring 140. At this time, a part of the upper end 113 of the valve stem 112 is inserted into the hole at the center of the retainer 130, and the retainer 130 is thus prevented from dropping from the valve spring 140.

In this embodiment, since the push member 64 can push out the retainer 130, the assembling position (stop position) in the state ST52 can be a position higher than the position where the retainer 130 is placed on the valve spring 140. FIG. 15 is an explanatory view of this. The state ST52 of FIG. 15 shows an enlarged view of the periphery of the retainer 130 in the state ST52 of FIG. 14. A state ST55 of FIG. 15 shows a state in which the assembly of the retainer 130 (the placement of the retainer 130 on the valve spring 140) is completed.

Figure 15:
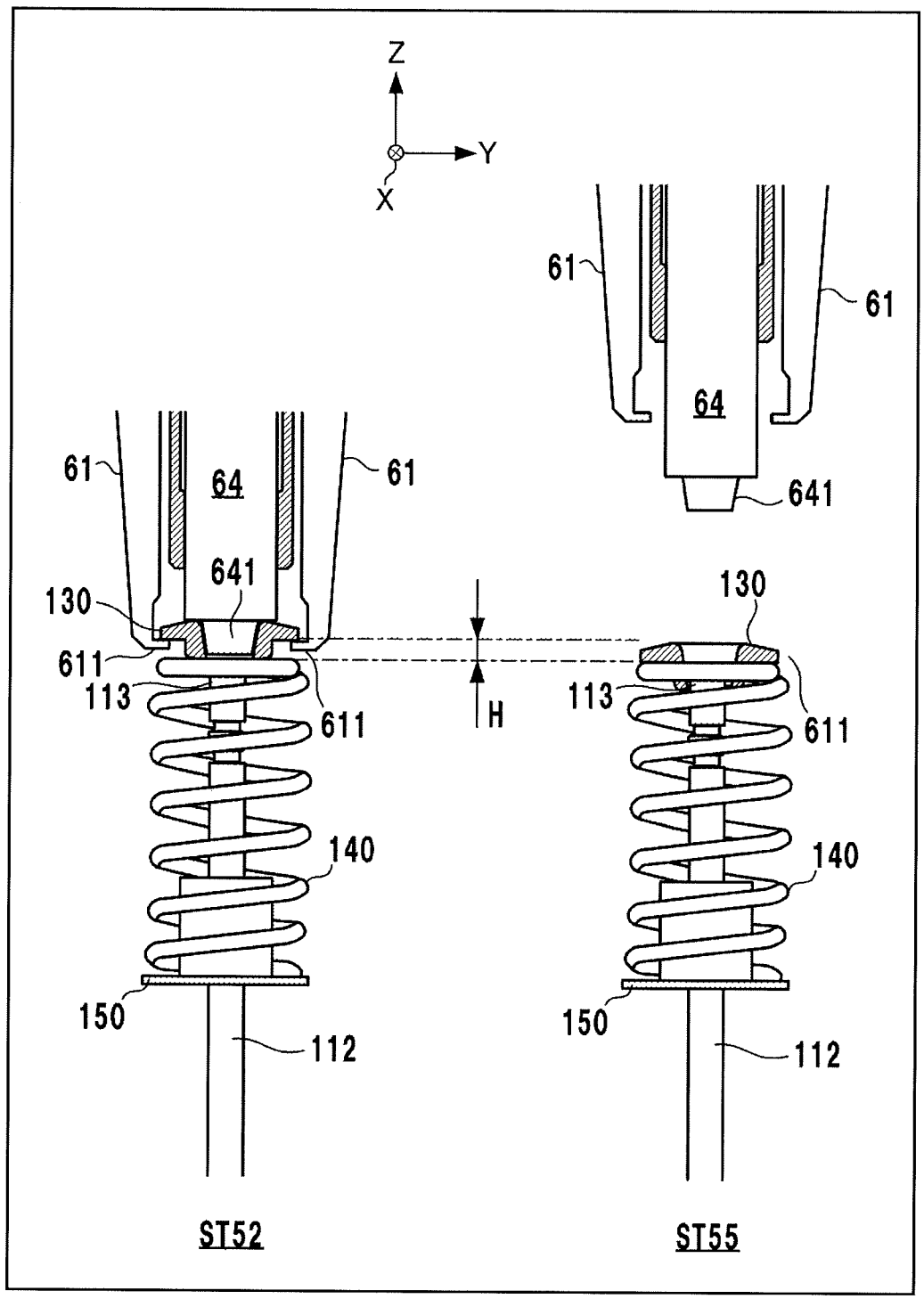
FIG. 15 is an explanatory view of the retainer assembling operation.

As shown in the state ST52 of FIG. 15, the assembling position where the lowering of the retainer assembling head 6 is stopped is set such that the lower surface of the flange portion of the retainer 130 is set at a position higher than the upper surface of the valve spring 140. In the example of FIG. 15, the assembling position is set to a position higher than the position of the retainer 130 after assembly by H. After that, as indicated by states ST53 and ST54 in FIG. 14, cancel of the holding of the retainer 130 and raising of the retainer assembling head 6 are started. The cancel and raising may be done simultaneously.

As described above, before the retainer 130 is placed on the valve spring 140, the retainer assembling head 6 stops lowering and starts rising. This can reduce the downward moving length and the upward moving length of the retainer assembling head 6 and shorten the cycle time. At the stage of canceling the holding of the retainer 130, the valve spring 140 is in a natural state (a state in which the biasing force does not act). It is therefore possible to prevent the retainer 130 from unstably behaving when the retainer 130 is placed and receives the reaction of the valve spring 140. When the holding of the retainer 130 is canceled, the retainer 130 is sandwiched between the valve spring 140 and the push member 64. Hence, the retainer 130 is continuously prevented from unstably behaving.

Cotter Assembling Head

Figure 16:
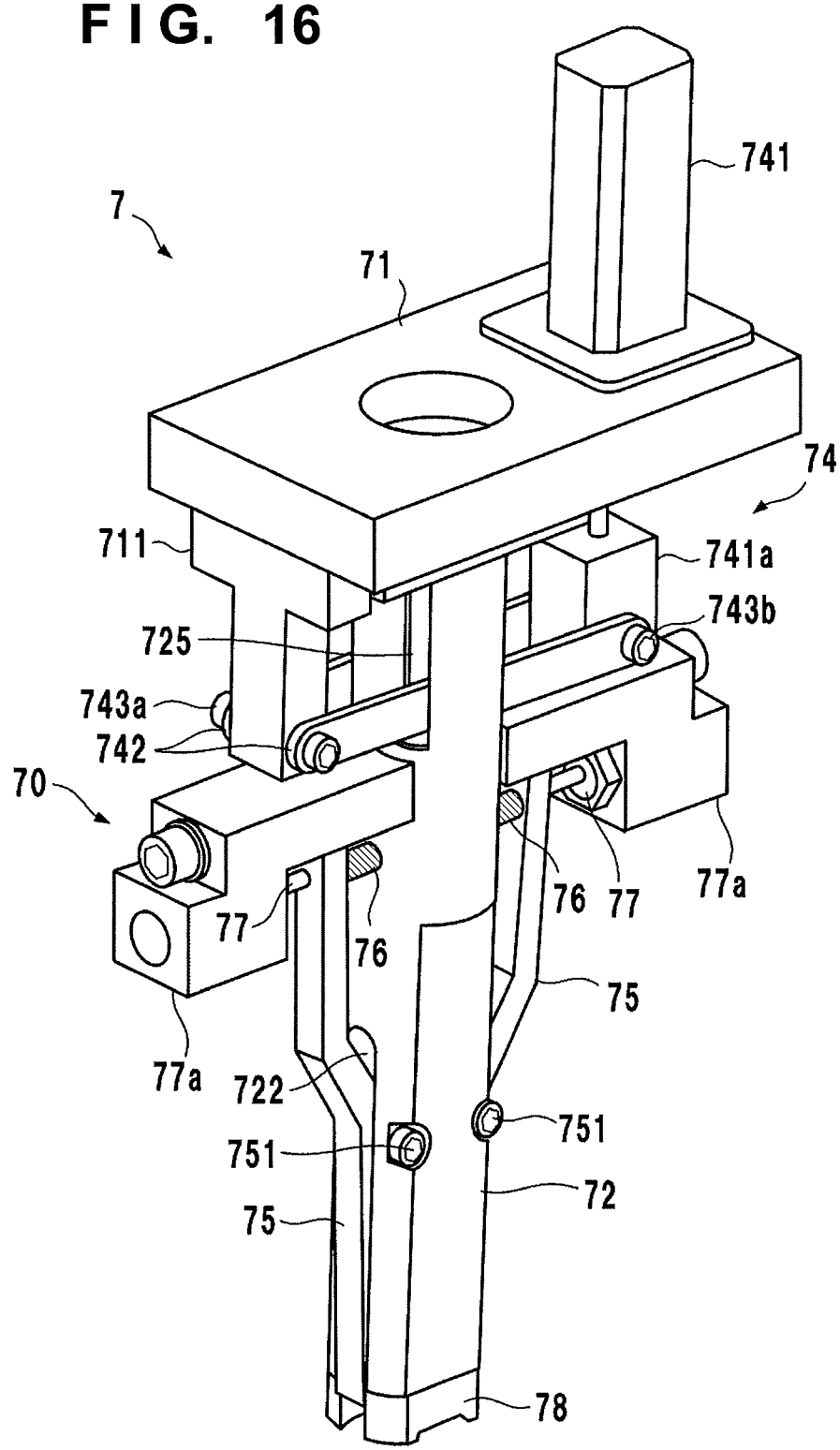
FIG. 16 is an explanatory view of a cotter assembling head.
Figure 17:
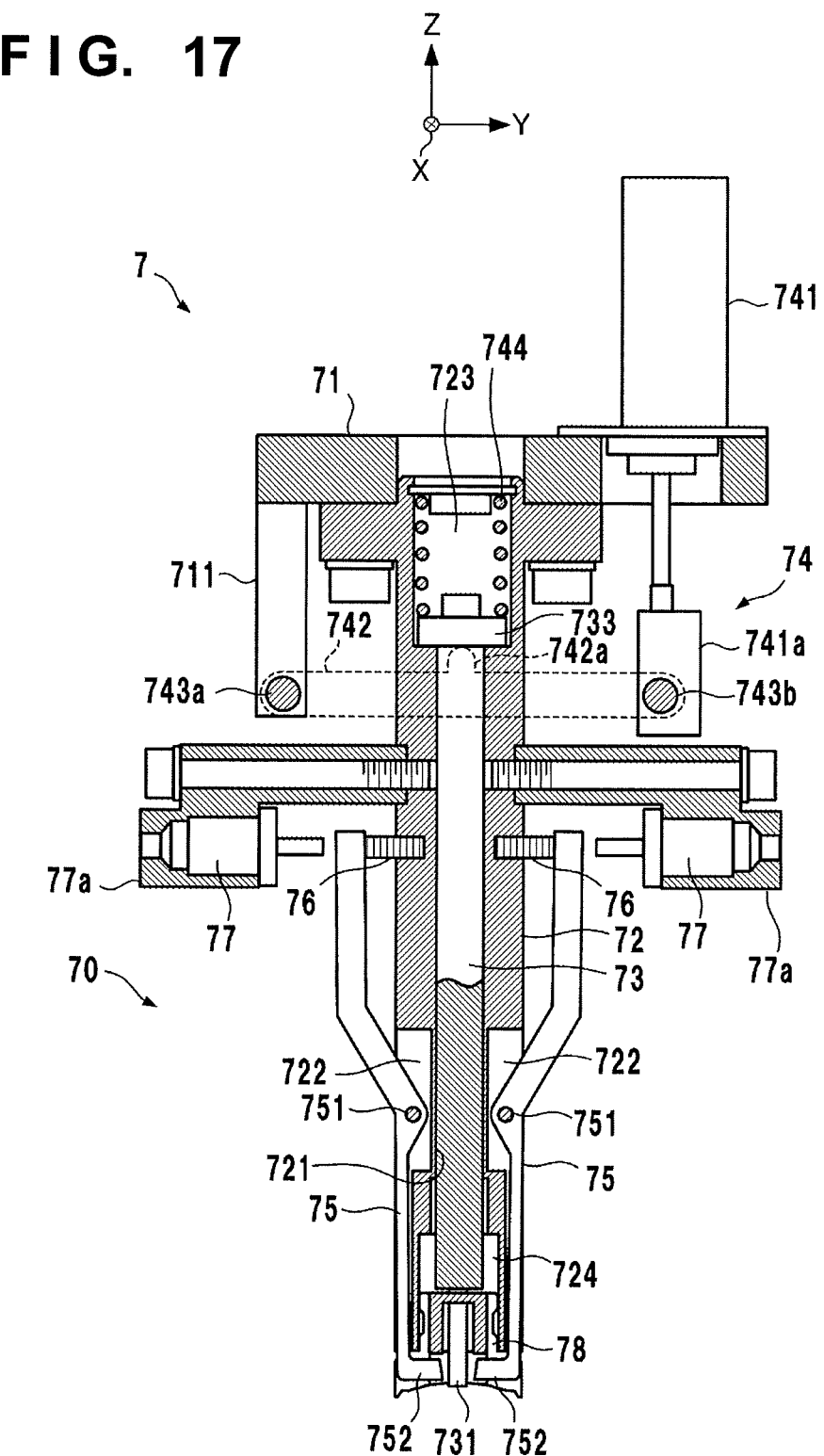
FIG. 17 is an explanatory view of the cotter assembling head.

The cotter assembling head 7 will be described with reference to FIGS. 16 to 25. The entire structure of the cotter assembling head 7 will be described first with reference to FIGS. 16 and 17. FIG. 16 is a perspective view of the cotter assembling head 7, and FIG. 17 is a sectional or cutaway view of a part of the cotter assembling head 7.

The cotter assembling head 7 includes a holding unit 70 and a storage member 78. The storage member 78 stores the pair of cotter pieces 120 in the separated state. The holding unit 70 includes a mechanism capable of holding the pair of cotter pieces 120 stored in the storage member 78 in the separated state, and canceling the separated state and pressing the pair of cotter pieces 120 against the upper end 113 of the valve stem 112. The structure of the holding unit 70 will be described first.

The holding unit 70 includes a holding base member 71, a support member 72, and a pair of pressing members 75. The support member 72 is a tubular body extending in the Z direction, and a shaft hole 721 extending in the Z direction is formed at the center of the support member 72. A separating member 73 is inserted into the shaft hole 721, and the movement of the separating member 73 in the Z direction is guided by the shaft hole 721.

A storage chamber 723 communicating with the shaft hole 721 is formed in the upper portion of the support member 72. An elastic member 744 is stored in the storage chamber 723. In this embodiment, the elastic member 744 is a coil spring, and is arranged between the top portion of the support member 72 and a disc-shaped boss portion 733 provided in the upper portion of the separating member 73 to bias the separating member 73 downward. The outer diameter of the boss portion 733 is larger than the outer diameter of the separating member 73.

A storage chamber 724 communicating with the shaft hole 721 is formed in the lower portion of the support member 72. When the storage member 78 is inserted into the storage chamber 724, the storage member 78 is positioned and fixed relative to the storage chamber 724.

Grooves 722 are formed in both side portions of the support member 72 from the center to the lower portion in the Y direction. The pressing members 75 are arranged in the grooves 722. Each pressing member 75 is an arm-shaped member extending in the Z direction, and supported by a shaft 751 to be swingable with respect to the support member 72.

The lower end of each pressing member 75 includes a pressing portion 752 bent inward. The end of the pressing portion 752 abuts against the outer surface of the cotter piece 120 and presses the cotter pieces 120. An elastic member 76 is arranged between the inner surface at the upper end of each pressing member 75 and the side wall of the support member 72. The elastic member 76 biases the inner surface at the upper end of the pressing member 75 outward in the radial direction. The pressing portions 752 are thus biased in the directions (close position directions) to come close to each other.

Support members (brackets) 77a are attached to the support member 72, and actuators 77 are supported by the support members 77a. The actuators 77 are arranged at portions facing the upper ends of the pressing members 75. The actuator 77 is, for example, an electric cylinder or an air cylinder. Each actuator 77 is driven to press the upper end of the pressing member 75 to the side of the support member 72 against the biasing of the elastic member 76, and the pressing portions 752 are moved in the directions (open position directions) to separate from each other. In this embodiment, the actuator 77 is provided for each pressing member 75. However, one actuator may be shared by the two pressing members 75, and the driving force may be distributed to the pressing members 75 by a link mechanism.

Figure 18:
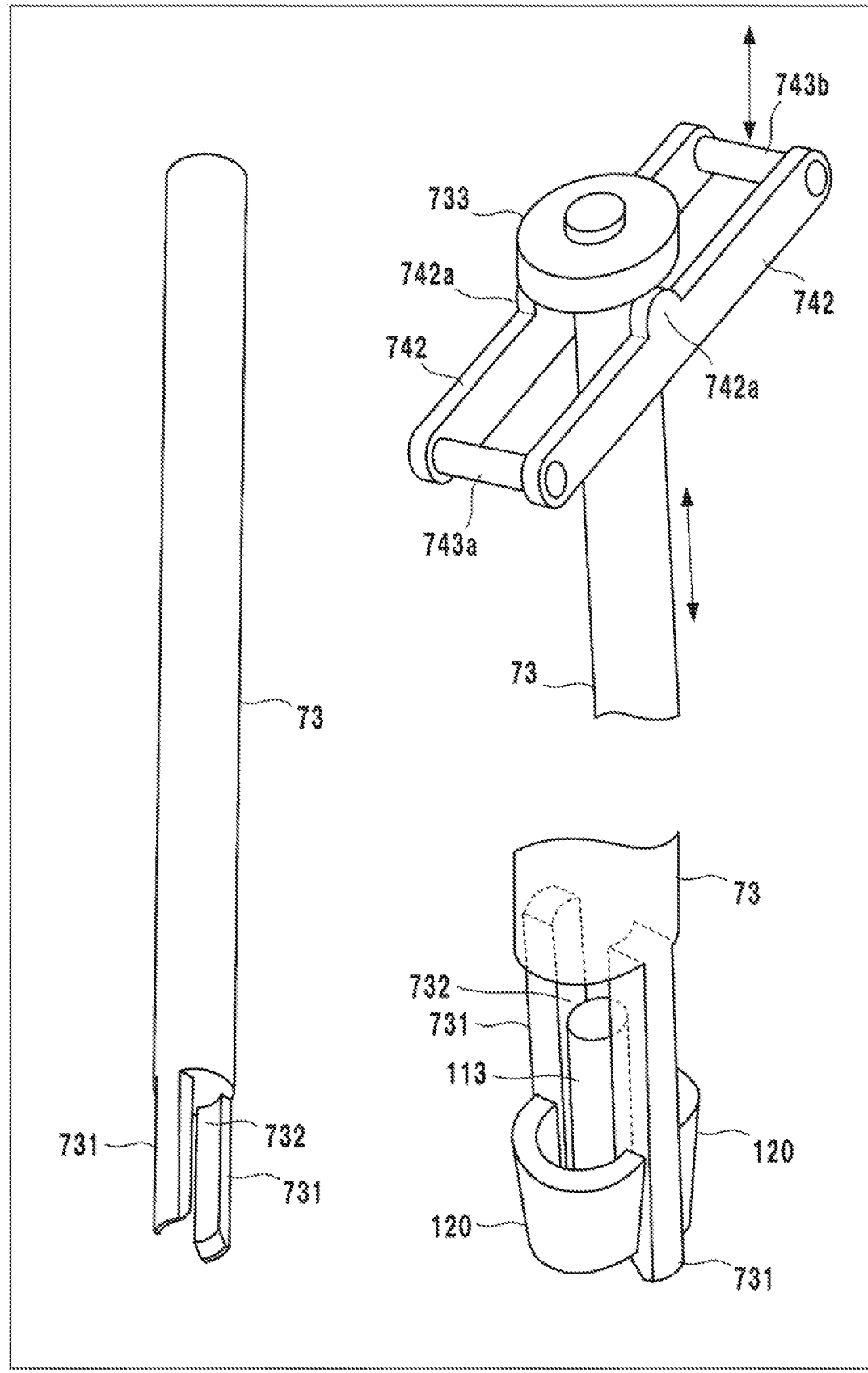
FIG. 18 is an explanatory view of a separating member and the driving unit thereof.

The upper end of the support member 72 is fixed to the lower surface side of the holding base member 71, and a driving unit 74 configured to raise/lower the separating member 73 in the Z direction is supported on the upper surface side of the holding base member 71. The separating member 73 and the driving unit 74 will be described with reference to FIG. 18 as well. FIG. 18 shows a perspective view of the separating member 73, a function explanatory view of the lower end of the separating member 73, and an explanatory view of the structure of a part of the driving unit 74.

The driving unit 74 includes an actuator 741, a pair of links 742, and the above-described elastic member 744.

The actuator 741 is, for example, an electric cylinder or an air cylinder. The rod portion of the actuator 741 advances/retreats in the Z direction, and has, at its distal end, an engaging member 741a having a rectangular body shape.

The pair of links 742 extend in the Y direction through a pair of grooves 725 provided near the upper end of the support member 72. The ends of the pair of links 742 are connected by shafts 743a and 743b provided in parallel to the x-axis direction. The shaft 743a is inserted into a hole (not shown) formed in a bracket 711 suspended on the lower surface side of the holding base member 71, and the position of the shaft 743a does not change. The shaft 743b is inserted into a long hole (not shown) formed in the engaging member 741a. An abutting portion 742a projecting upward is formed at the center of each link 742.

When the rod portion of the actuator 741 is retreated (moved upward in FIG. 17), the engaging member 741a rises, and the shaft 743b inserted into the engaging member 741a rises, as indicated by an arrow in FIG. 18. Since the position of the shaft 743a is fixed, the pair of links 742 pivot about the shaft 743a (counterclockwise in FIG. 17), and the abutting portions 742a abut against the lower surface of the boss portion 733 and raise the boss portion 733. Accordingly, the separating member 73 integrally connected to the boss portion 733 is raised upward. When the rod portion of the actuator 741 is retreated, the separating member 73 is moved upward against the biasing of the elastic member 744. When the driving of the actuator 741 is stopped, the separating member 73 is moved downward by the biasing of the elastic member 744.

The separating member 73 is a columnar member extending in the Z direction. As shown in FIG. 18, a slit-shaped opening portion 732 opening downward and capable of receiving the upper end 113 of the valve stem 112 is formed at the lower end of the separating member 73. The lower end of the separating member 73 thus forms a pair of spacer portions 731 branched into two parts. Each spacer portion 731 can intervene between the pair of cotter pieces 120 supplied in the separated state from the cotter supplier 3 and maintain the pair of cotter pieces 120 in the separated state. When the separating member 73 is moved upward by the driving unit 74 to retreat the spacer portions 731 from the pair of cotter pieces 120, the separated state of the pair of cotter pieces 120 is canceled. The separating member 73 and the driving unit 74 thus constitute a shutter mechanism that switches between a state in which the spacer portions 731 intervene between the pair of cotter pieces 120 and a state in which the separation of the pair of cotter pieces 120 is canceled.

Figure 19:
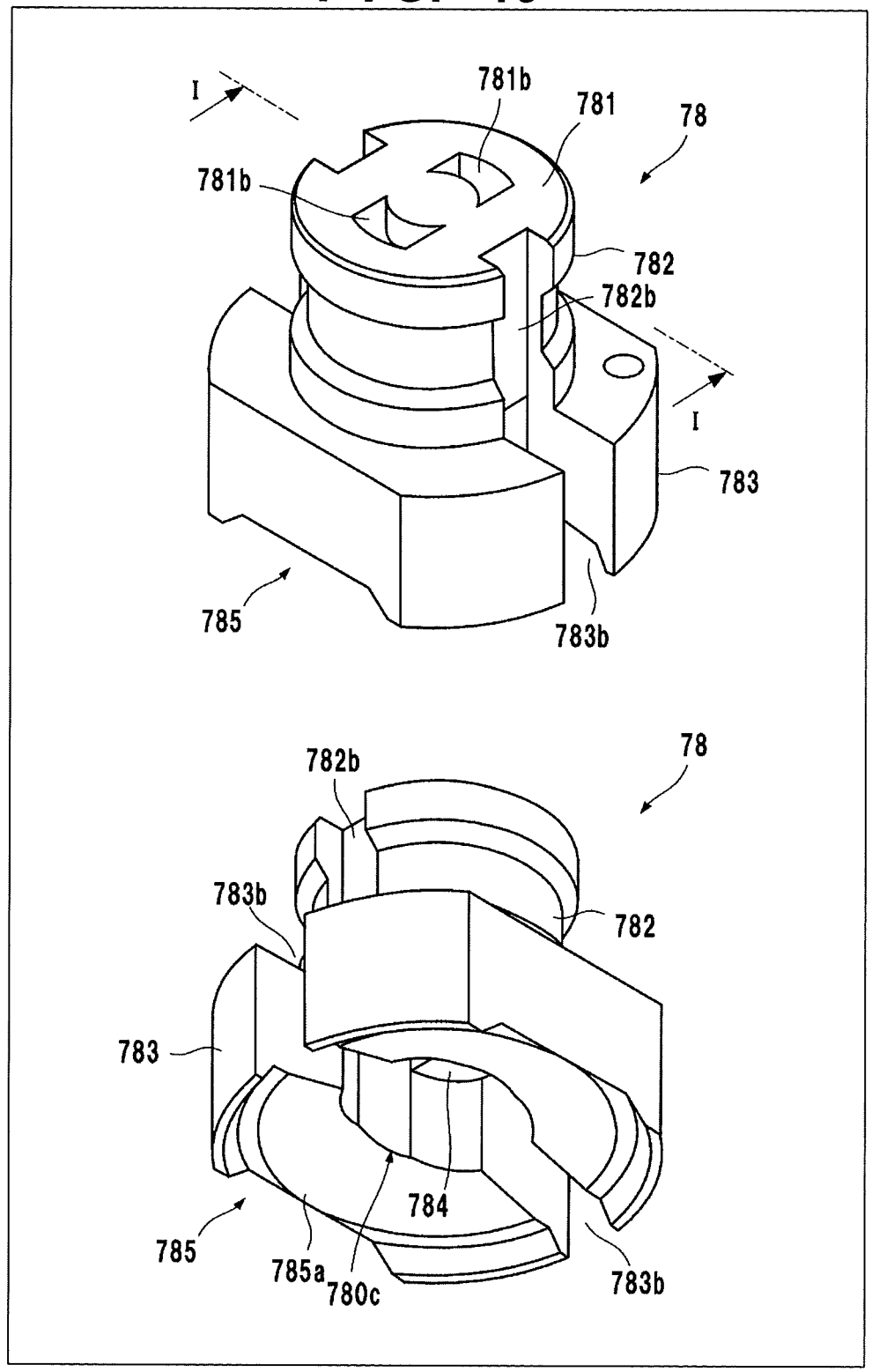
FIG. 19 is an explanatory view of a storage member.
Figure 20:
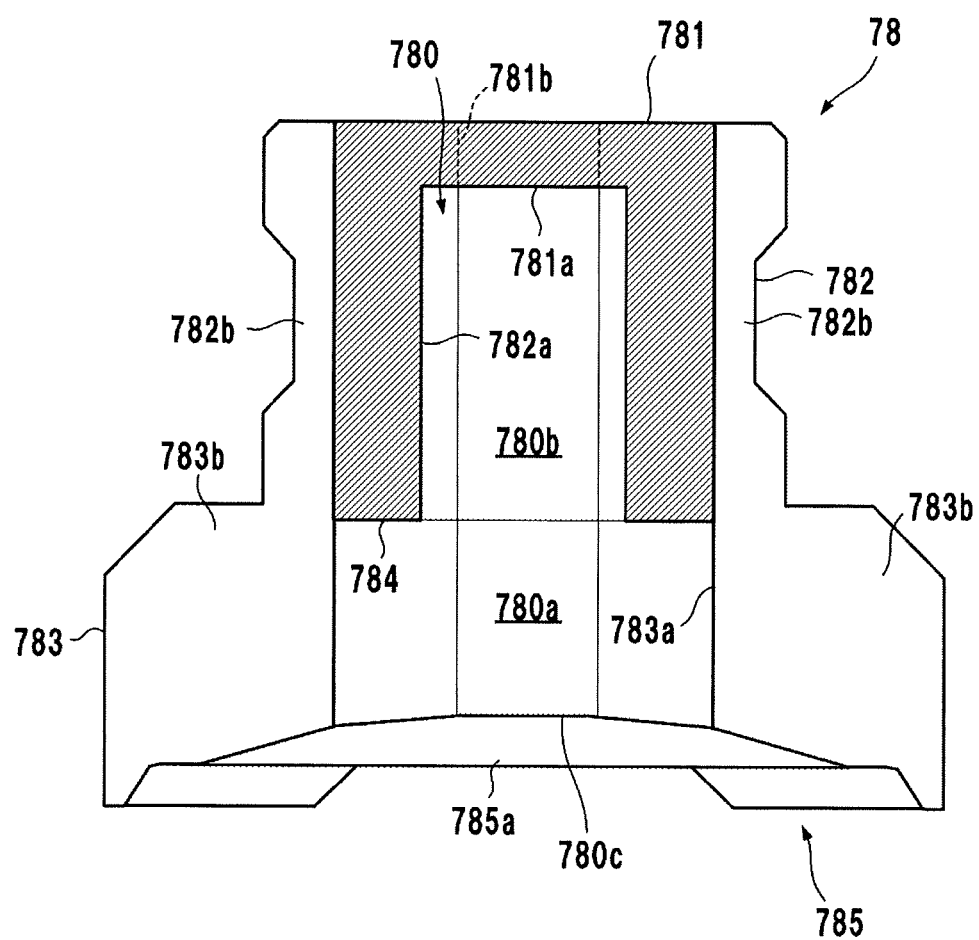
FIG. 20 is an explanatory view of the storage member.
Figure 21:
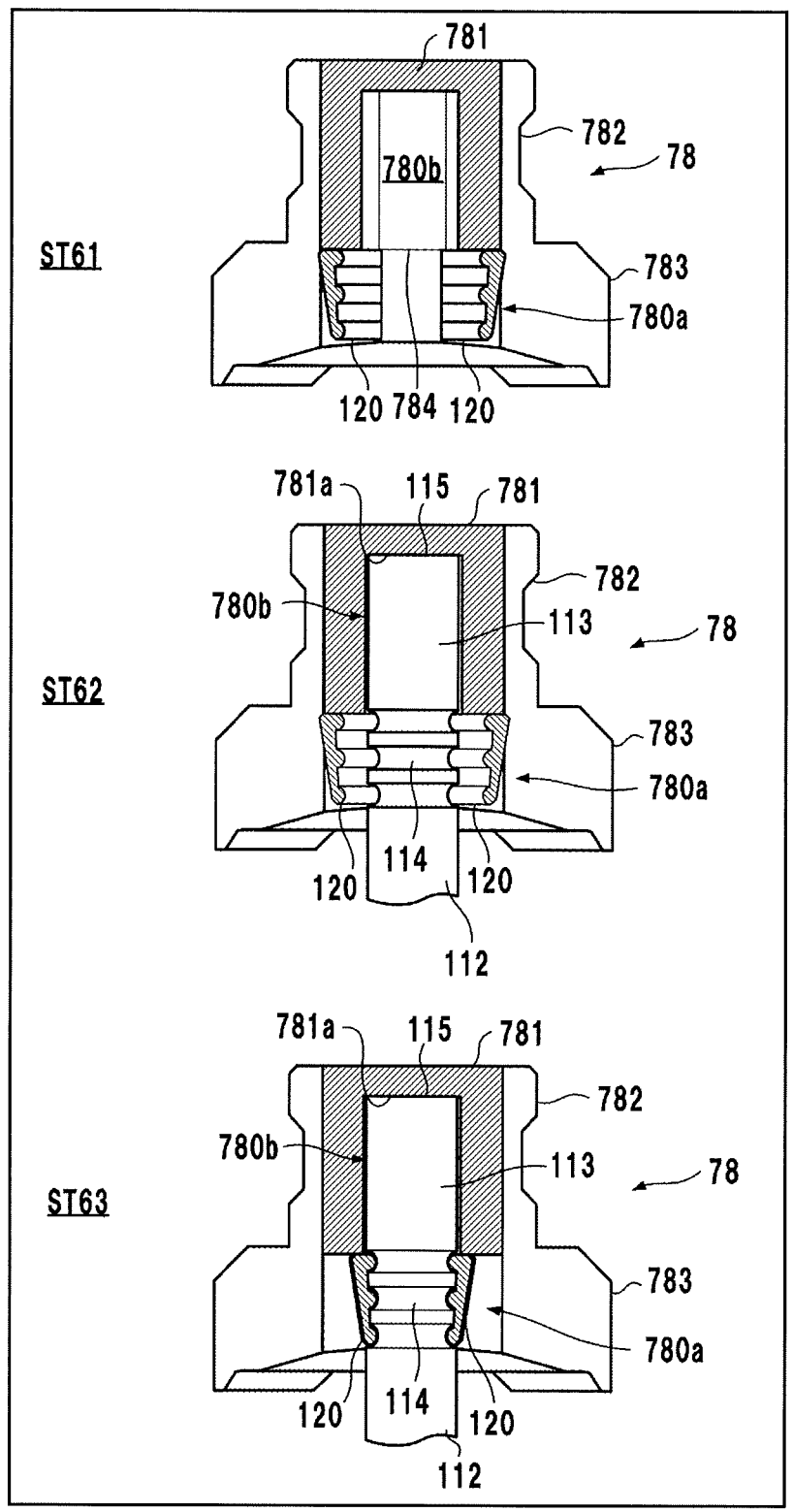
FIG. 21 is an explanatory view of the storage member.

The structure and function of the storage member 78 will be described with reference to FIGS. 19 to 21. First, the structure of the storage member 78 will be described with reference to FIGS. 19 and 20. FIG. 19 shows two perspective views of the storage member 78 viewed from the upper side and lower side, and FIG. 20 is a sectional view taken along a line I-I in FIG. 19.

The storage member 78 includes an upper wall portion 781 and side wall portions (peripheral wall portions) 782 and 783, and has an internal storage chamber 780 defined by the wall portions. The storage chamber 780 is a space whose lower side is opened by an opening 780c, and includes an upper storage portion 780b defined by the upper wall portion 781 and the side wall portion 782, and a lower storage portion 780a defined by the side wall portion 783.

The storage portion 780a is a space to store the pair of cotter pieces 120. The pair of cotter pieces 120 supplied in the separated state from the cotter supplier 3 are inserted into the storage portion 780a from the lower side. The storage portion 780b is a space to store the upper portion of the upper end 113 of the valve stem 112. The upper end 113 of the valve stem 112 is also inserted into the storage portions 780a and 780b from the lower side.

The storage portion 780a and the storage portion 780b are provided continuously in the vertical direction. The storage portion 780b has an almost elliptical cross-sectional shape, and the storage portion 780a has an almost circular cross-sectional shape. The storage portion 780b is provided to have a sectional area smaller than that of the storage portion 780a.

A pair of holes 781b extending through in the Z direction are formed in the upper wall portion 781. The holes 781b are formed into a size and shape that allow the pair of spacer portions 731 of the separating member 73 to be inserted. When the separating member 73 is moved by the driving unit 74 in the Z direction (insertion/removal direction) relative to the storage member 78, the pair of spacer portions 731 of the separating member 73 can be inserted/removed into/from the center of the storage chamber 780 from above the storage member 78.

The inner wall of the storage chamber 780 includes an upper wall 781a (e.g., a second abutting portion) that is the lower surface of the upper wall portion 781, side walls 782a and 783a that are the inner surfaces of the side wall portions 782 and 783, and a horizontal step portion 784 (e.g., a first abutting portion) that is the boundary between the storage portion 780a and the storage portion 780b. The side walls 782a and 783a are uneven in conformity with the outer surfaces of the spacer portions 731 and the pair of cotter pieces 120.

Grooves 782b with closed bottoms are formed in the side wall portion 782 on both sides in the Y direction. The pressing members 75 are inserted into the grooves 782b from the sides, and interference of the pressing members 75 is avoided. Grooves 783b communicating with the storage portion 780a are formed in the side wall portion 783 on both sides in the Y direction. The grooves 783b allow the pressing portions 752 of the pressing members 75 to enter the storage portion 780a. That is, by the opening/closing operation of the pressing portions 752 by the pivotal movement of the storage member 78, the pressing portions 752 can enter the storage chamber 780 from both sides of the storage member 78 or retreat.

An abutting portion 785a that abuts against the upper surface of the retainer 130 is formed on a bottom portion 785 of the storage member 78. The abutting portion 785a is formed into a truncated conical shape conforming to the shape of the upper surface of the retainer 130 so as to surround the opening 780c.

The storage form of the pair of cotter pieces 120 or the upper end 113 of the valve stem 112 in the storage chamber 780 will be described with reference to FIG. 21. A state ST61 shows a state in which the pair of cotter pieces 120 in the separated state are stored in the storage portion 780a. The upper end faces of the pair of cotter pieces 120 inserted into the storage chamber 780 and stored in the storage portion (cotter storage portion) 780a abut against the step portion 784. The Z-direction absolute position of the pair of cotter pieces 120 relative to the storage member 78 is thus determined. The step portion 784 is sometimes called an abutting portion 784, or a first positioning reference portion or first positioning reference surface.

A state ST62 shows a state in which the pair of cotter pieces 120 in the separated state are stored in the storage portion 780a, and the upper end 113 of the valve stem 112 is stored in the storage portion 780b. An upper end face 115 of the valve stem 112 inserted into the storage chamber 780 and stored in the storage portion (valve stem storage portion) 780b abuts against the upper wall 781a. The Z-direction absolute position of the valve stem 112 relative to the storage member 78 is thus determined. As a result, the Z-direction absolute positions of the pair of cotter pieces 120 and the valve stem 112 relative to the storage member 78 are determined, and the relative positional relationship between the pair of cotter pieces 120 and the valve stem 112 is uniquely determined. The upper wall 781a is sometimes called an abutting portion 781a, or a second positioning reference portion or second positioning reference surface.

A state ST63 shows a state in which the pair of cotter pieces 120 are closed from the state ST62 to abut their end faces and engage them with the engaging portion 114 of the valve stem 112. In this embodiment, the engaging portion 114 has a plurality of protrusions, and the pair of cotter pieces 120 have a plurality of groove portions to be engaged with the protrusions.

In this embodiment, the valve stem 112 and the pair of cotter pieces 120 are physically and mechanically positioned to each other in the Z direction using the storage member 78 as a reference. When the distance between the abutting portion 781a and the abutting portion 784 is designed based on the distance from the upper end face 115 of the valve stem 112 to the engaging portion 114, theoretically, the valve stem 112 and the pair of cotter pieces 120 are always positioned in the Z direction. In other words, the relative positional relationship between the valve stem 112 and the pair of cotter pieces 120 is uniquely determined by the design/manufacturing accuracy of the storage member 78 and the separating member 73. Hence, when engaging the pair of cotter pieces 120 with the valve stem 112, a position shift never occurs. Particularly, if the engaging portion 114 has the plurality of protrusions, and the pair of cotter pieces 120 has the plurality of groove portions, higher positioning accuracy is required. In this embodiment, it is possible to cope with the requirement of positioning accuracy.

Figure 22:
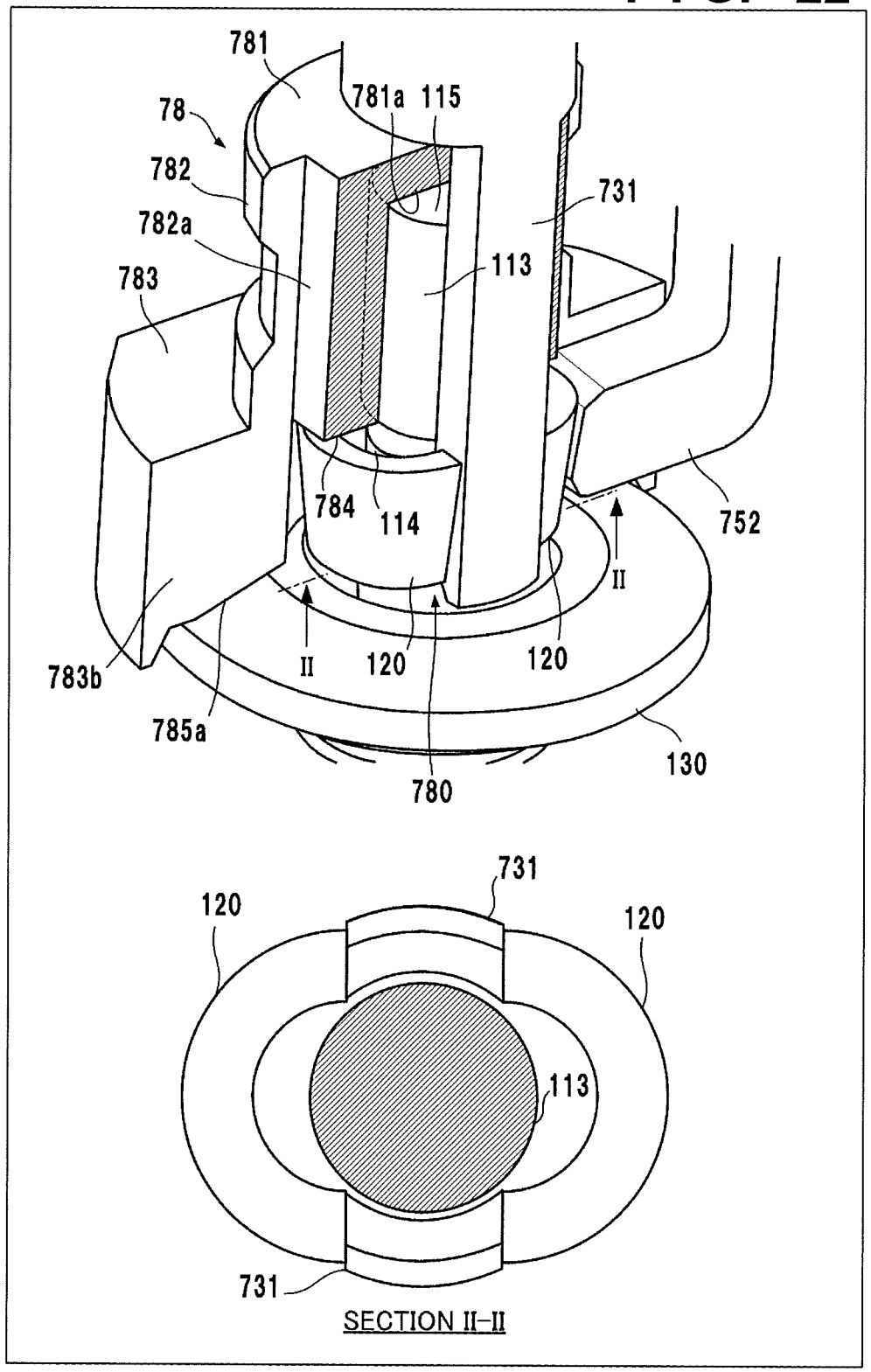
FIG. 22 is an explanatory view of the storage member.

FIG. 22 shows a cutaway perspective view of the peripheral structure of the storage member 78 and a sectional view taken along a line II-II at the time of assembling operation corresponding to the state ST62. In the cutaway perspective view, one of the pair of pressing members 75 is not illustrated.

The pair of cotter pieces 120 are stored between the spacer portions 731 and the inner wall of the storage chamber 780. The pair of cotter pieces 120 are biased toward the center of the storage chamber 780 by the pressing portions 752 of the pressing member 75. However, the spacer portions 731 intervene between the pair of cotter pieces 120. Hence, as indicated by the state ST63 in FIG. 21, the pair of cotter pieces 120 are not closed, and the separated state with a gap capable of receiving the upper end 113 of the valve stem 112 is maintained. In addition, the pair of cotter pieces 120 are clamped by the pair of spacer portions 731 and the pressing portions 752 and held by the cotter assembling head 7. In other words, the pressing portions 752 bias the outer surfaces of the pair of cotter pieces 120 toward the center of the storage chamber 780, that is, the pair of spacer portions 731, and in this state, the pair of cotter pieces 120 are held by the cotter assembling head 7.

Figure 23:
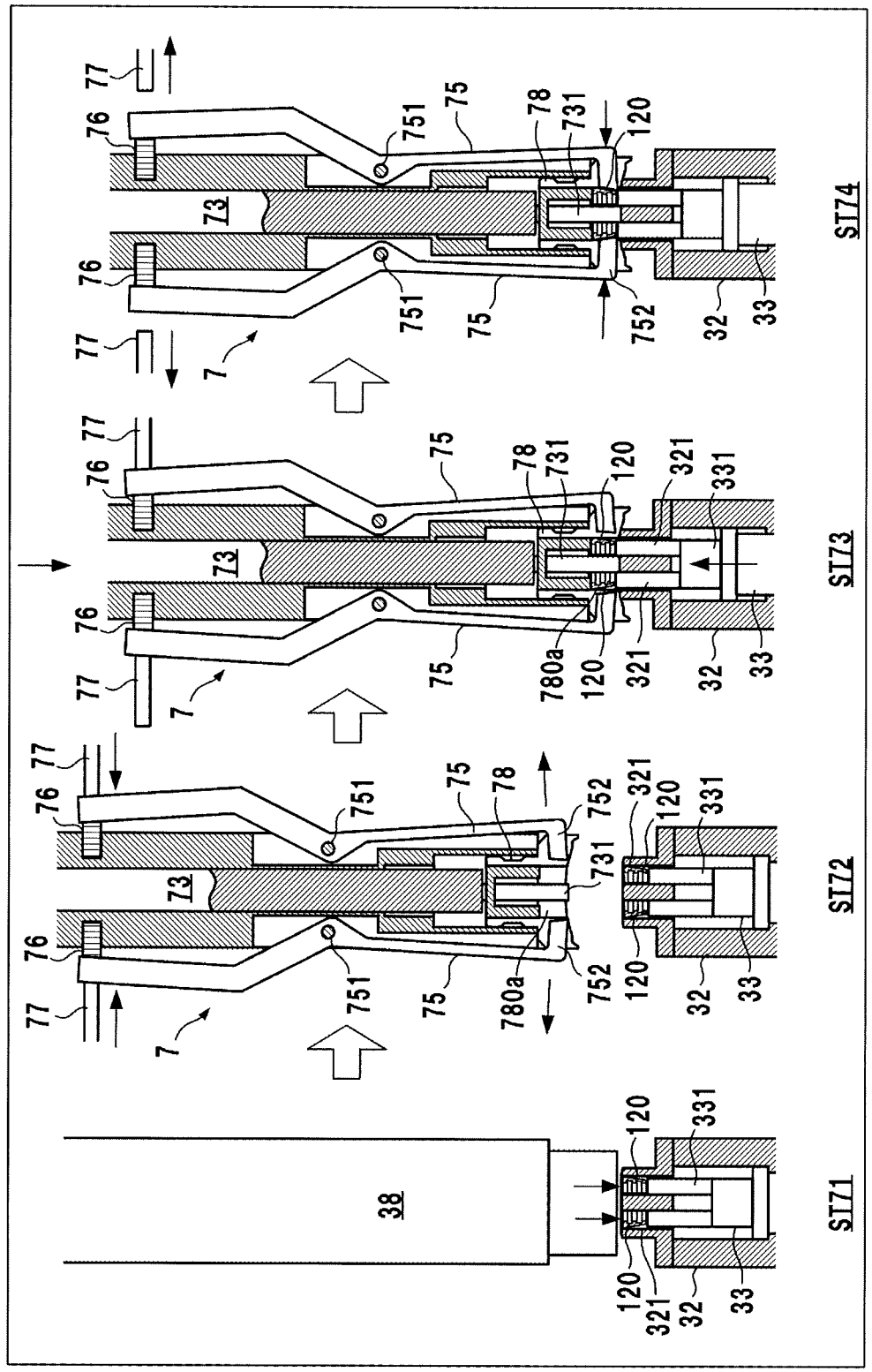
FIG. 23 is an explanatory view of the cotter assembling head.

The operation of the cotter assembling head 7 will be described with reference to FIGS. 23 to 25. FIG. 23 shows an operation (the operation shown in FIGS. 5 and 6) of receiving the supply of the pair of cotter pieces 120 from the cotter supplier 3 by the cotter assembling head 7.

A state ST71 shows a state in which the supply unit 38 loads the pair of cotter pieces 120 to the pair of storage holes 321 of the storage 32. A state ST72 shows a state in which the storage 32 and the cotter assembling head 7 face each other in the Z direction. When the actuators 77 are driven, the pressing members 75 pivot to the open positions. The separating member 73 is located at the lowering position.

The elevating unit 55b lowers the cotter assembling head 7 to abut the opening 780c of the storage member 78 against the upper surface of the storage 32, and at the same time, the lifting member 33 is lifted up by an elevating unit (not shown), as indicated by a state ST73. Accordingly, the pair of cotter pieces 120 enter the storage portion 780a from below the storage chamber 780 and abut against the abutting portion 784, and are thus positioned in the Z direction. In addition, since the pair of spacer portions 731 intervene between the pair of cotter pieces 120, the pair of cotter pieces 120 are prevented from coming close to each other.

As indicated by a state ST74, biasing by the actuator 77 stops, and the elastic members 76 apply a biasing force to make the pressing members 75 pivot to the close positions. The pair of cotter pieces 120 are clamped between the pressing portions 752 and the spacer portions 731 and held by the cotter assembling head 7. The extraction (pickup) operation of the pair of cotter pieces 120 is thus completed.

Figure 24:
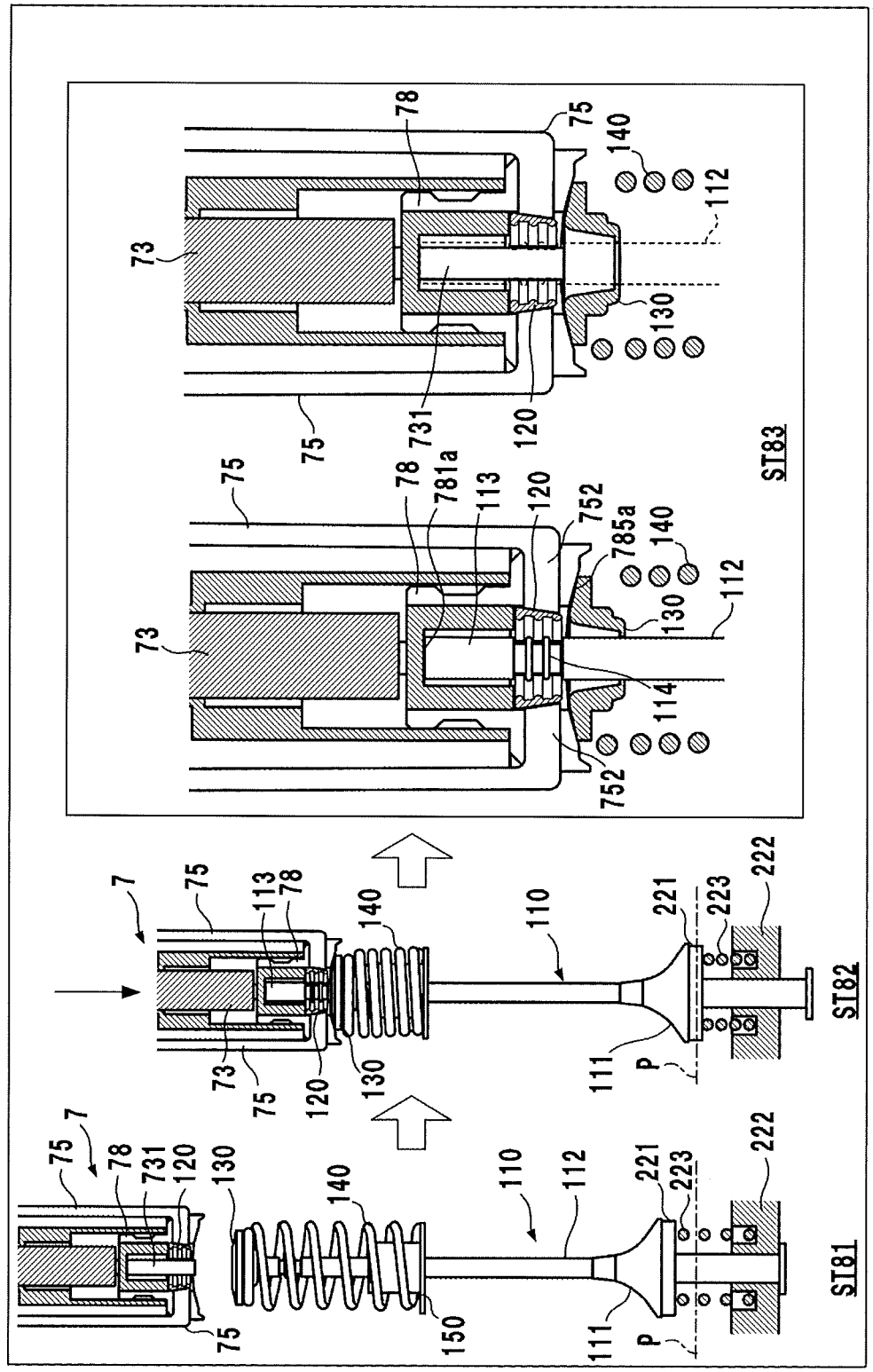
FIG. 24 is an explanatory view of the cotter assembling head.

FIGS. 24 and 25 show an operation (the operation of the state ST33 in FIG. 10 and the state ST35 in FIG. 11) of assembling the retainer 130 to the valve stem 112 via the pair of cotter pieces 120 by the cotter assembling head 7.

A state ST81 shows a state in which the cotter assembling head 7 is located above the assembling position. The separating member 73 and the valve stem 112 are located coaxially. The retainer 130 is placed on the valve spring 140 in the previous step (the state ST55 in FIG. 15).

As shown in a state ST82, the cotter assembling head 7 is lowered by the elevating unit 55b to the assembling position and stopped. In this process, the abutting portion 785a of the storage member 78 abuts against the upper surface of the retainer 130. Simultaneously, the retainer 130 is pushed down to the valve stem 112, and the valve spring 140 is compressed. In addition, when the upper end 113 of the valve stem 112 enters the opening portion 732 between the spacer portions 731, and the upper end face 115 abuts against the abutting portion 781a, the valve stem 112 (valve 110) is pushed down.

When the valve 110 is pushed down, the abutting member 221 of the valve support unit 22 that biases the valve 110 upward is also pushed down. After that, when the arrival of the abutting member 221 at the detection position P is detected by the sensors 23a and 23b, the lowering of the cotter assembling head 7 is stopped.

A state ST83 shows the state on the periphery of the storage member 78 when the lowering of the cotter assembling head 7 is stopped. The state shown in FIG. 22 is obtained. The position of the valve stem 112 is mainly shown on the left side, and the position of the spacer portion 731 is mainly shown on the right side. The spacer portions 731 intervene between the pair of cotter pieces 120, and the separated state with a gap capable of receiving the upper end 113 of the valve stem 112 is maintained. The upper end face 115 of the valve stem 112 abuts against the abutting portion 781a halfway through the lowering of the cotter assembling head 7, and the valve stem 112 is positioned relative to the storage member 78 in the Z direction. Positioning between the pair of cotter pieces 120 and the engaging portion 114 of the valve stem 112 in the Z direction is thus completed. The lowering stop position of the cotter assembling head 7 is set to a position where the upper end face 115 of the valve stem 112 properly abuts against the abutting portion 781a.

Next, the actuator 741 is driven to raise the separating member 73, as indicated by a state ST84, and the pair of spacer portions 731 are retreated from the pair of cotter pieces 120. The pair of cotter pieces 120 are biased toward the center of the storage chamber 780 by the pair of pressing portions 752. Hence, the separated state is canceled by the retreat of the spacer portions 731, and the pair of cotter pieces 120 are pressed against the upper end 113 of the valve stem 112. The pair of cotter pieces 120 are moved to the center of the storage chamber 780, and their end faces abut and close. Accordingly, a state in which the pair of cotter pieces 120 engage with the engaging portion 114, as indicated by a state ST85, is obtained.

Next, the elevating unit 55*b* raises the cotter assembling head 7 from the assembling position. Even during the raising of the cotter assembling head 7, the pair of cotter pieces 120 are biased toward the center of the storage chamber 780 by the pair of pressing portions 752 and therefore do not return to the separated state. When the cotter assembling head 7 is raised, the retainer 130 is also lifted up by the elastic restoring force of the valve spring 140, and the pair of cotter pieces 120 are inserted into the hole at the center of the retainer 130, as shown in a state ST86. The elastic restoring force of the valve spring 140 continuously acts even after that. However, the pair of cotter pieces 120 prevent the retainer 130 from further rising, and the assembling operation of the retainer 130 to the valve stem 112 is completed.

According to the assembling method of this embodiment, the pair of cotter pieces 120 are held in advance in the separated state and assembled to the valve stem 112. For this reason, a separation failure of the pair of cotter pieces 120 cannot occur. In addition, the pair of cotter pieces 120 are oriented and positioned by the first positioning reference portion such that the posture of the cotter pieces 120 relative to the storage member 78 of the cotter assembling head 7 is set in a predetermined state (completely separated state). The cotter pieces 120 in the adjusted posture and position are held in this state and supplied to the valve stem 112. The valve stem 112 is oriented and positioned by the second positioning reference portion such that its position in the vertical direction relative to the storage member 78 of the cotter assembling head 7 is set to a predetermined position. As a result, the relative positional relationship between the pair of cotter pieces 120 and the valve stem 112 in the vertical direction and in the horizontal direction is uniquely determined.

Hence, according to the assembling method of this embodiment, the pair of cotter pieces 120 are supplied to the upper end 113 of the valve stem 112 always in the same posture and the same positional relationship. It is therefore possible to assemble the retainer 130 to the upper end 113 of the valve stem 112 by the pair of cotter pieces 120 easily at high accuracy without adjusting the apparatus, in other words, without much trial and error. In addition, since the assembling apparatus according to this embodiment is adjustment-free, the apparatus can quickly be started, resulting in a large effect of shortening the manufacturing period.

The present invention is not limited to the above embodiments, and various changes and modifications can be made within the spirit and scope of the present invention. Therefore, to apprise the public of the scope of the present invention, the following claims are made.

The invention claimed is:

1. An assembling apparatus that assembles a retainer by engaging a pair of cotter pieces with an upper end of a valve stem, comprising:
   a preparation unit configured to prepare the pair of cotter pieces in a separated state with a gap capable of receiving the upper end of the valve stem;
   an assembling head configured to hold, in a separated state, the pair of cotter pieces in the separated state prepared by the preparation unit and engage the pair of cotter pieces with the upper end of the valve stem; and
   a moving unit configured to move the assembling head between the preparation unit and the valve stem,
   wherein the assembling head comprises:
   a storage member including a storage chamber configured to store the pair of cotter pieces in the separated state from below; and
   a holding unit capable of holding, in the separated state, the pair of cotter pieces stored in the storage chamber and canceling the separated state to press the pair of cotter pieces against the upper end of the valve stem,
   the storage member includes:
   an upper wall portion, a first side wall and a second side wall which define the storage chamber, the storage chamber including an upper storage portion defined by the upper wall portion and the first side wall, and a lower storage portion defined by the second side wall;
   a first abutting portion provided with the lower storage portion, against which upper end faces of the pair of cotter pieces stored in the lower storage portion abut; and
   a second abutting portion provided with the upper storage portion, against which an upper end face of the valve stem inserted from below the storage chamber abuts,
   the second abutting portion positions the valve stem relative to the storage chamber in an axial direction of the valve stem, and
   the first abutting portion positions the pair of cotter pieces relative to the storage chamber in the axial direction.

2. The assembling apparatus according to claim 1, wherein the holding unit comprises:
   a separating member provided to be insertable/removable to/from a center of the storage chamber from above the storage member and including spacer portions intervening between the pair of cotter pieces;
   a driving unit configured to move the separating member in an insertion/removal direction relative to the storage member; and
   a pair of pressing members provided to be able to advance/retreat to/from the storage chamber from both sides of the storage member and configured to bias the pair of cotter pieces toward the center of the storage chamber.

3. The assembling apparatus according to claim 2, wherein the spacer portions of the separating member have an opening portion capable of receiving the upper end of the valve stem, and
   the pair of cotter pieces in the separated state are stored between the spacer portions and an inner wall of the storage chamber and pressed against the spacer portions by the pair of pressing members.

4. The assembling apparatus according to claim 2, wherein the pair of pressing members are provided to be swingable between an open position and a close position, and
   the holding unit further comprises:
   at least one elastic member configured to bias the pair of pressing members to the close position; and
   at least one actuator configured to drive the pair of pressing members from the close position to the open position against a biasing force of the elastic member.

5. The assembling apparatus according to claim 1, wherein the storage chamber includes:
   the lower storage portion configured to store the pair of cotter pieces; and
   the upper storage portion continuously provided above the lower storage portion and having a sectional area smaller than the sectional area of the lower storage portion,
   the second abutting portion is provided on the upper wall of the upper storage portion, and
   the first abutting portion is provided at a step portion between the lower storage portion and the upper storage portion.

6. The assembling apparatus according to claim 1, wherein the storage member comprises, on a bottom portion, an abutting portion configured to surround an opening of the storage chamber and abut against an upper surface of the retainer.

7. The assembling apparatus according to claim 1, further comprising a support unit configured to abut against a valve head provided at a lower end of the valve stem and press the valve stem upward while permitting a downward movement of the valve stem.

8. The assembling apparatus according to claim 7, further comprising a sensor configured to detect an amount of the downward movement of the valve stem.

9. An assembling head that assembles a retainer by engaging a pair of cotter pieces with an upper end of a valve stem, comprising:
- a storage member including a storage chamber configured to store the pair of cotter pieces from below in a separated state with a gap capable of receiving the upper end of the valve stem; and
- a holding unit capable of holding, in the separated state, the pair of cotter pieces stored in the storage chamber and canceling the separated state to press the pair of cotter pieces against the upper end of the valve stem, wherein the storage member includes:
- an upper wall portion, a first side wall and a second side wall which define the storage chamber, the storage chamber including an upper storage portion defined by the upper wall portion and the first side wall, and a lower storage portion defined by the second side wall;
- a first abutting portion provided with the lower storage portion, against which upper end faces of the pair of cotter pieces stored in the lower storage portion abut; and
- a second abutting portion provided with the upper storage portion, against which an upper end face of the valve stem inserted from below the storage chamber abuts,
- the second abutting portion positions the valve stem relative to the storage chamber in an axial direction of the valve stem, and
- the first abutting portion positions the pair of cotter pieces relative to the storage chamber in the axial direction.

10. The assembling head according to claim 9, wherein the holding unit comprises:
- a separating member provided to be insertable/removable to/from a center of the storage chamber from above the storage member and including spacer portions intervening between the pair of cotter pieces;
- a driving unit configured to move the separating member in an insertion/removal direction relative to the storage member; and
- a pair of pressing members provided to be able to advance/retreat to/from the storage chamber from both sides of the storage member and configured to bias the pair of cotter pieces toward the center of the storage chamber.

* * * * *